United States Patent
Suzaki et al.

(10) Patent No.: US 10,025,341 B2
(45) Date of Patent: Jul. 17, 2018

(54) PEDAL REACTIVE FORCE CONTROLLER

(71) Applicant: HONDA MOTOR CO., LTD., Minato-Ku, Tokyo (JP)

(72) Inventors: Go Suzaki, Wako (JP); Hideto Nebuya, Wako (JP); Naoto Sen, Wako (JP); Yoshikazu Sato, Wako (JP); Kohei Maruyama, Wako (JP); Masatoshi Kubota, Wako (JP); Jiro Hamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 15/033,271

(22) PCT Filed: Oct. 30, 2013

(86) PCT No.: PCT/JP2013/079445
§ 371 (c)(1),
(2) Date: Apr. 29, 2016

(87) PCT Pub. No.: WO2015/063894
PCT Pub. Date: May 7, 2015

(65) Prior Publication Data
US 2016/0259362 A1 Sep. 8, 2016

(51) Int. Cl.
  *G05G 1/38* (2008.04)
  *B60K 26/04* (2006.01)
  (Continued)

(52) U.S. Cl.
  CPC .............. *G05G 1/38* (2013.01); *B60K 26/02* (2013.01); *B60K 26/021* (2013.01); *B60K 26/04* (2013.01);
  (Continued)

(58) Field of Classification Search
  CPC ........ G05G 1/38; B60K 26/02; B60K 26/021; B60K 26/04; B60K 35/00; B60K 2310/22;
  (Continued)

(56) References Cited

U.S. PATENT DOCUMENTS

2002/0161487 A1   10/2002   Kojima et al.
2003/0135317 A1*  7/2003   Hijikata ............... B60K 26/021
                                                      701/70
(Continued)

FOREIGN PATENT DOCUMENTS

CN        102656046 A        9/2012
JP        2002-323930 A      11/2002
(Continued)

OTHER PUBLICATIONS

Office Action dated May 19, 2017 issued in the counterpart Chinese Patent Application 201380079371.7 with the English translation thereof.

(Continued)

*Primary Examiner* — Bao Long T Nguyen
(74) *Attorney, Agent, or Firm* — Carrier Blackman & Associates, P.C.; Joseph P. Carrier; Jingli Wang

(57) ABSTRACT

Provided is a pedal reactive force controller including: a reaction force adding unit for adding reaction force to a pedal operated by a driver; and an information transmission unit for converting a depression amount of the pedal detected by a stroke sensor into visual information, and conveying the depression amount to the driver by displaying the visual information in an operation amount display section.

15 Claims, 11 Drawing Sheets

(51) Int. Cl.
  *B60K 35/00* (2006.01)
  *B60W 10/00* (2006.01)
  *B60W 20/00* (2016.01)
  *B60K 26/02* (2006.01)
  *F02D 11/10* (2006.01)
  *F02D 41/22* (2006.01)

(52) U.S. Cl.
  CPC ............ *B60K 35/00* (2013.01); *B60W 10/00* (2013.01); *B60W 20/00* (2013.01); *F02D 11/10* (2013.01); *B60K 2026/023* (2013.01); *B60K 2310/22* (2013.01); *B60K 2350/1096* (2013.01); *B60K 2350/203* (2013.01); *F02D 2041/228* (2013.01); *Y10S 903/93* (2013.01)

(58) Field of Classification Search
  CPC ...... B60K 2350/1096; B60K 2350/203; B60K 2026/022–2026/023; B60K 2350/352; B60K 2350/1076; B60W 10/00; B60W 20/00; B60W 50/16; B60W 2540/10–2540/103; F02D 11/10; F02D 2041/228; Y10S 903/93
  USPC .............................. 701/36, 70; 340/438, 439
  See application file for complete search history.

(56) References Cited

U.S. PATENT DOCUMENTS

| | | | | |
|---|---|---|---|---|
| 2004/0172185 | A1* | 9/2004 | Yamamura | B60W 30/16 701/96 |
| 2006/0231074 | A1 | 10/2006 | Ueno et al. | |
| 2009/0125173 | A1 | 5/2009 | Komatsu et al. | |
| 2009/0322503 | A1* | 12/2009 | Suzuki | B60K 6/365 340/438 |
| 2010/0052888 | A1* | 3/2010 | Crowe | B60K 6/48 340/461 |
| 2010/0057280 | A1* | 3/2010 | Crowe | B60K 6/48 701/22 |
| 2011/0125367 | A1* | 5/2011 | Sakaguchi | B60K 26/021 701/36 |
| 2012/0191312 | A1* | 7/2012 | Kimura | B60W 50/16 701/70 |
| 2012/0253624 | A1 | 10/2012 | Maruyama et al. | |
| 2013/0066508 | A1* | 3/2013 | Ueno | B60K 6/48 701/22 |
| 2013/0186229 | A1* | 7/2013 | Drews | B60K 26/021 74/513 |
| 2016/0200194 | A1* | 7/2016 | Maruyama | B60K 26/021 74/512 |
| 2016/0318396 | A1* | 11/2016 | Sato | G01D 7/04 |

FOREIGN PATENT DOCUMENTS

| | | |
|---|---|---|
| JP | 2004-314871 A | 11/2004 |
| JP | 2005-022627 A | 1/2005 |
| JP | 2005-271618 A | 10/2005 |
| JP | 2006-281798 A | 10/2006 |
| JP | 2007-182224 A | 7/2007 |
| JP | 2008-074321 A | 4/2008 |
| JP | 2008-174150 A | 7/2008 |
| JP | 2009-113706 A | 5/2009 |
| JP | 2010-228593 A | 10/2010 |
| JP | 2011-245919 A | 12/2011 |
| JP | 2012-164277 A | 8/2012 |

OTHER PUBLICATIONS

Japanese Office Action issued in JP patent application 2015-521164.

* cited by examiner

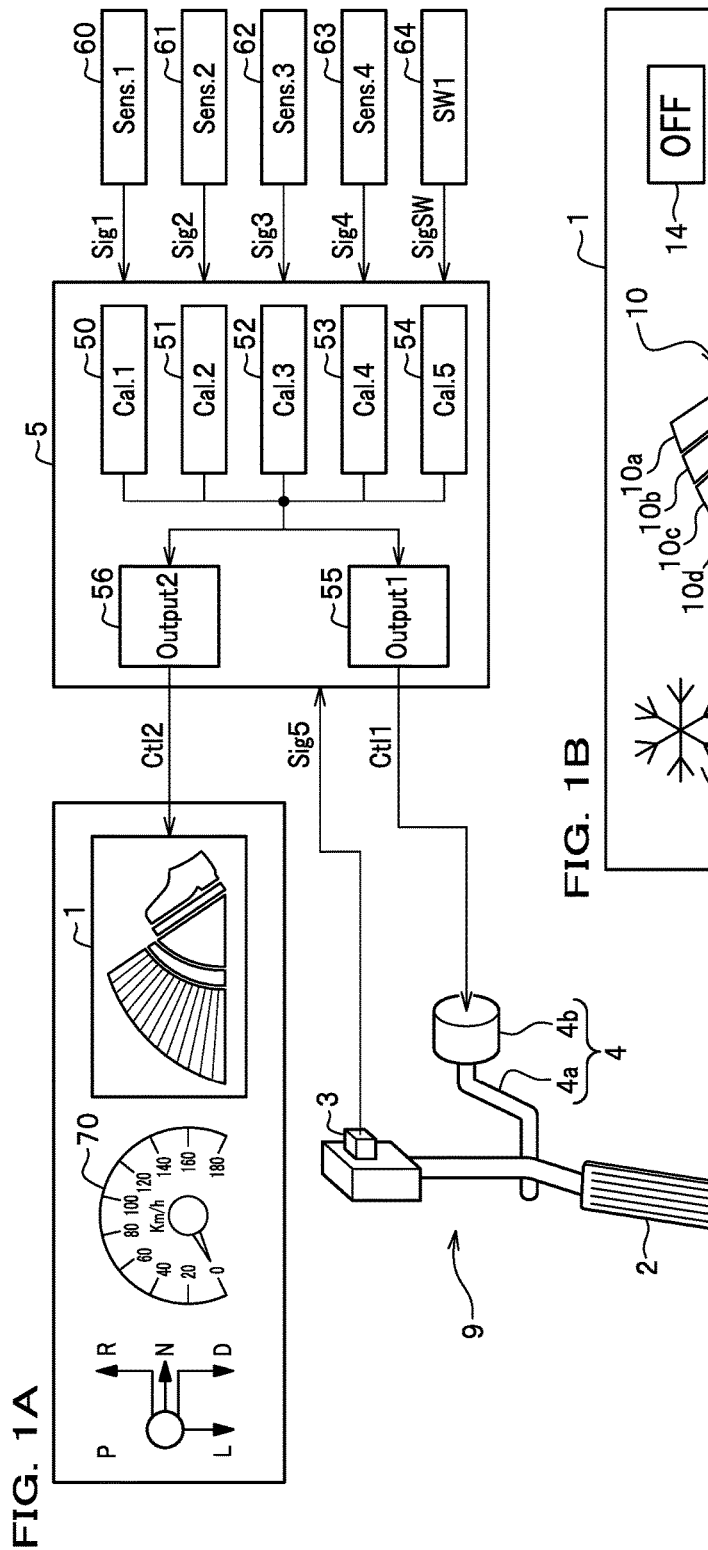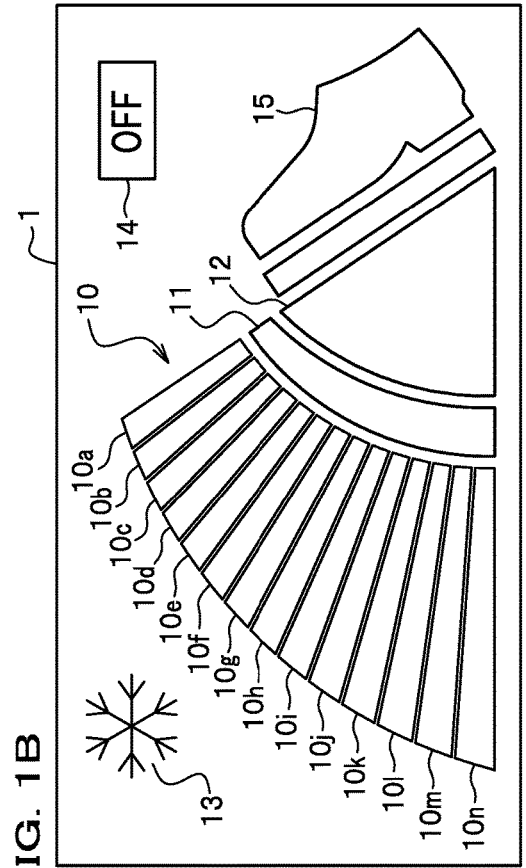
FIG. 1A
FIG. 1B

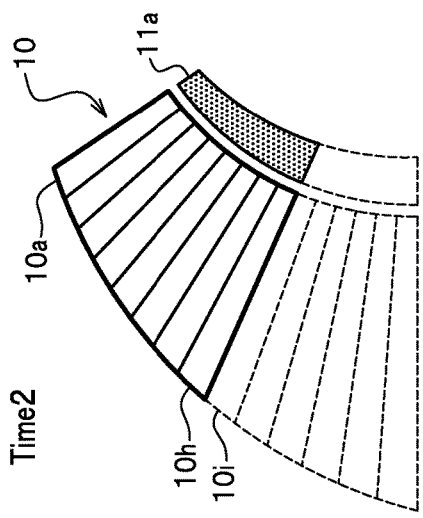
FIG. 5C Time2
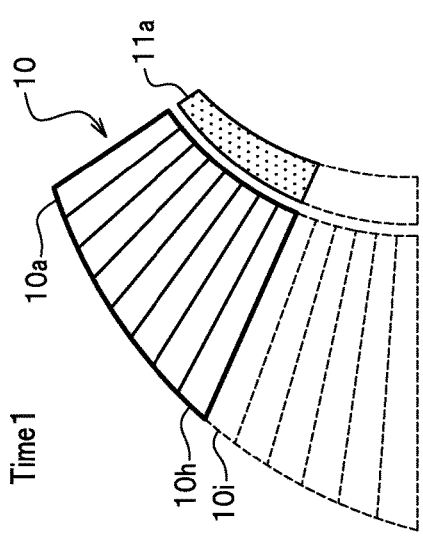
FIG. 5B Time1
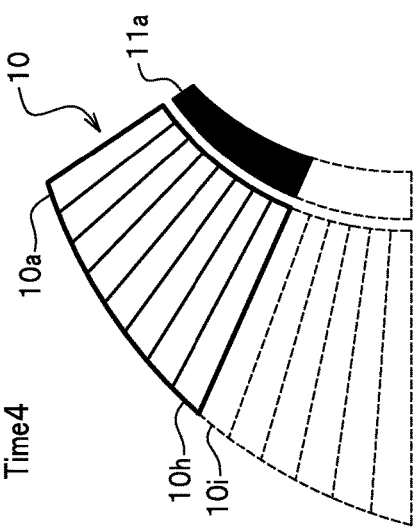
FIG. 5E Time4
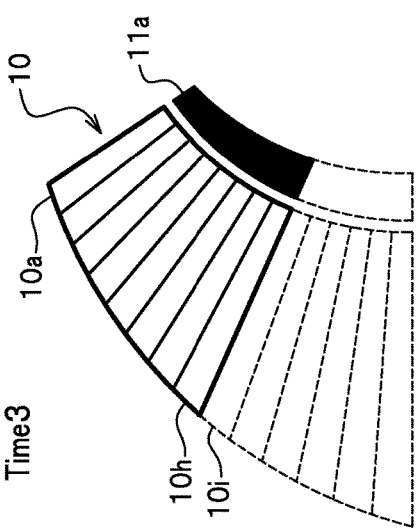
FIG. 5D Time3
FIG. 5A Time0

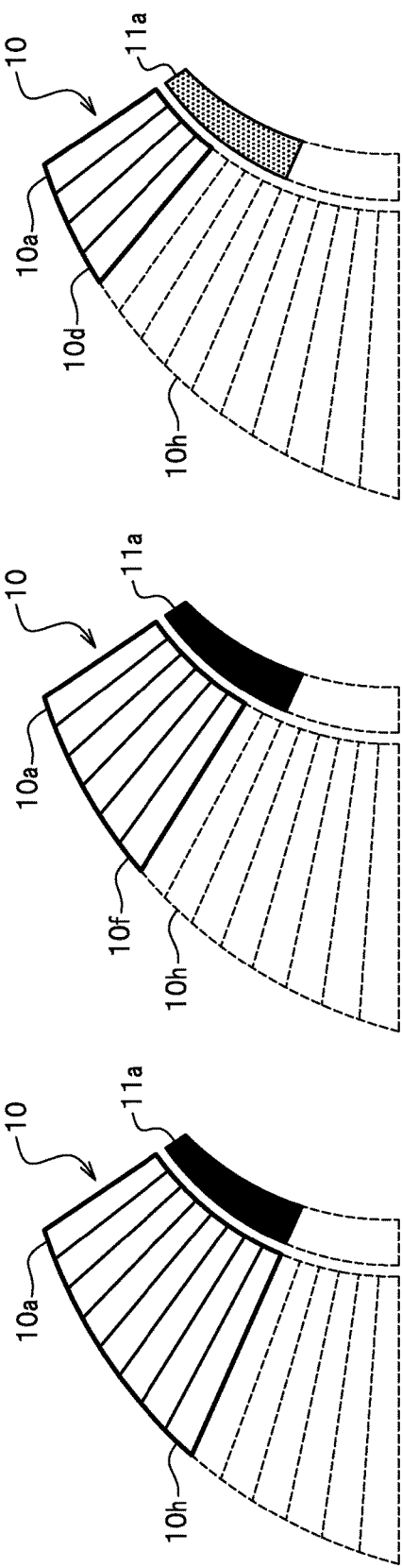

PEDAL REACTIVE FORCE CONTROLLER

TECHNICAL FIELD

The present invention relates to a pedal reactive force controller of a vehicle.

BACKGROUND ART

For example, Patent Literature 1 discloses a driving operation assisting device (pedal reactive force controller) configured: to calculate risk potential for the drive by the driver; and to convey the calculated risk potential to the driver in the form of both accelerator pedal reaction force (an amount of stimulus) and visual information.

The driving operation assisting device disclosed in Patent Literature 1 is capable of conveying the risk potential in excess of a predetermined maximum value to the driver in the form of the visual information (e.g., a flashing symbol for a preceding vehicle) to be displayed on a display monitor (see FIG. 34). Otherwise, the driving operation assisting device is capable of conveying the risk potential in excess of a predetermined maximum value to the driver in the form of the visual information represented by a graph showing changes in the risk potential (see FIG. 40).

The driving operation assisting device disclosed in Patent Literature 1 is capable of assisting the driver in accurately grasping conditions around his/her own vehicle by showing the driver how large the risk potential is, and how the risk potential is changing, in the form of the visual information in addition to the accelerator pedal reaction force (the amount of stimulus) in the above-described manner.

CITATION LIST

Patent Literature

Patent Literature 1: JP 2007-182224 A

SUMMARY OF INVENTION

Technical Problem

A driving operation assisting device of Patent Literature 1 calculates a possibility of a collision with an obstacle as risk potential. In contrast to this, if a driving operation assisting device is designed to assist the driver in his/her driving maneuver while not allowing a drive efficiency to decrease by calculating a possibility of the decrease in the drive efficiency as risk potential, simple assistance of the driver in only grasping conditions around his/her vehicle is not sufficient for such a driving operation assisting device. In that case, it is desirable that the driving operation assisting device be configured to be capable of providing the driver with information (a stimulus, visual information, and the like) representing how large a margin for accelerator pedal depression is before the risk potential (the decrease in the drive efficiency) exceeds a predetermined maximum value. The thus-configured driving operation assisting device would make it possible for the driver to depress the accelerator pedal within a range which does not allow the risk potential to exceed the predetermined maximum value based on the information provided by the driving operation assisting device. Accordingly, the driver can drive the vehicle with high efficiency.

The driving operation assisting device of Patent Literature 1 is capable of showing the driver how large the risk potential is, and how the risk potential is changing, in the form of a stimulus (accelerator pedal reaction force) and visual information, but is not capable of providing the driver with visual information representing a relationship between an amount of accelerator pedal depression and how large the risk potential is. As a result, there is likelihood that the driving operation assisting device of Patent Literature 1 provides the driver with visual information which is insufficient to assist the driver in his/her driving maneuver beyond the avoidance of the collision with the obstacle.

Against these backgrounds, an object of the present invention is to provide a pedal reactive force controller which includes information transmission means capable of showing the driver a relationship between an amount of pedal depression and a change in reaction force of a pedal in the form of visual information.

Solution to Problem

In order to solve the above problem, the present invention provides a pedal reactive force controller including: a reaction force adding unit for adding reaction force to a pedal operated by a driver; and an information transmission unit for converting a depression amount of the pedal detected by a stroke sensor into visual information, and conveying the depression amount to the driver by displaying the visual information in an operation amount display section. The present invention is characterized in that the reaction force adding unit sets an operation threshold value of a depression amount at which the reaction force adding unit starts to add the reaction force to the pedal, and the visual information includes: first discriminating information showing that no reaction force is being added to the pedal; and second discriminating information showing that the reaction force is being added to the pedal, the operation amount display section is divided into: a first area for displaying the visual information inclusive of the first discriminating information; and a second area for displaying the visual information inclusive of the second discriminating information, the information transmission unit conveys the depression amount to the driver in a form of the visual information including the first discriminating information, and displayed in the first area, while the depression amount is less than the operation threshold value, the information transmission unit conveys the depression amount to the driver in the form of the visual information including the second discriminating information in addition to the first discriminating information, and displayed in the first area and the second area, when the depression amount becomes greater than the operation threshold value, and as the depression amount becomes larger, more of the visual information is displayed in the operation amount display section.

According to the present invention, the recognition information included in the visual information displayed in the operation amount display section differs depending on whether or not the reaction force is added to the pedal. With the assistance of the visual information displayed in the operation amount display section, the driver can visually recognize whether or not the reaction force is added to the pedal, and what relationship exists between the depression amount of the pedal and the reaction force added to the pedal.

In addition, when the depression amount of the pedal exceeds the operation threshold value, the reaction force is added to the pedal, and the reaction force of the pedal is amplified steeply. Thereby, the driver is given a large stimulus. For this reason, the driver can securely recognize the amplification of the reaction force of the pedal. In addition, the recognition information included in the visual information displayed in the operation amount display section differs depending on whether or not the depression amount of the pedal exceeds the operation threshold value. For this reason, the driver can also visually recognize the addition of the reaction force to the pedal (the amplification of the reaction force of the pedal). That is to say, with the assistance of the thus-given stimulus and the change in the recognition information, the driver can securely recognize the amplification of the reaction force of the pedal. Furthermore, the driver can visually recognize the relationship between the depression amount of the pedal and the reaction force of the pedal.

The pedal reactive force controller according to the present invention is characterized in that the visual information is displayed in the form of light emission of a plurality of segments arranged in an arc, and forming the operation amount display section, the segments sequentially emit light according to the depression amount, and a light emission color of the segments is different between the first area and the second area.

According to the present invention, when the depression amount of the pedal exceeds the operation threshold value, the add-on reaction force is added to the pedal reaction force, and the pedal reaction force is amplified steeply. Thereby, the driver is given a large stimulus. For this reason, the driver can securely recognize the amplification of the pedal reaction force. In addition, the recognition information included in the visual information displayed in the operation amount display section differs depending on whether or not the depression amount of the pedal exceeds the operation threshold value. For this reason, the driver can also visually recognize the addition of the add-on reaction force to the pedal reaction force (the amplification of the pedal reaction force). That is to say, with the assistance of the thus-given stimulus and the change in the recognition information, the driver can securely recognize the amplification of the pedal reaction force. Furthermore, the driver can visually recognize the relationship between the depression amount of the pedal and the pedal reaction force.

The pedal reactive force controller according to the present invention is characterized in that the pedal is an accelerator pedal with which the driver adjusts power, outputted from a power source of a vehicle, for driving a drive wheel, the power source includes a first state and a second state which are divided based on an amount of energy to be consumed to generate the power, the first state is a state in which no energy is consumed, or the amount of energy consumption is less than that in the second state, and in a case where the first state and the second state are switched over to each other according to the depression amount, the reaction force adding unit sets the operation threshold value at the depression amount at which the first state is switched over to the second state.

According to the present invention, the power source includes: the first state in which the power source generates the drive power without consuming the energy or by consuming a smaller amount of energy; and the second state in which the power source generates the drive power by consuming a larger amount of energy. In addition, when the power source switches over from the first state to the second state, the reaction force is added to the pedal, and the reaction force of the pedal is amplified. Thus, with the assistance of the amplification of the reaction force of the pedal, the driver can recognize the depression amount which increases the amount of energy consumption. For this reason, the driver can operate the pedal (accelerator pedal) within a range which inhibits the energy consumption, and accordingly can drive the vehicle while inhibiting the energy consumption.

For example, in a case where the power source hybrid-drives using a gasoline engine and a drive motor, the gasoline engine drives while consuming fuel (gasoline) as the energy. On the other hand, the drive motor drives using electric power which, for example, is generated by the drive of the gasoline engine and stored in a power storage device. Thereby, the consumption of the fuel (energy) is inhibited. With this taken into consideration, the state in which the gasoline engine drives is the second state, while the state in which only the drive motor drives is the first state. Furthermore, the configuration made such that the reaction force is added to the pedal, that is to say, reaction force of the pedal is amplified, when the first state in which only the drive motor drives is switched over to the second state in which the gasoline engine drives makes it possible for the driver to operate the pedal within a range which does not allow the gasoline engine to drive, and to accordingly inhibit the fuel (energy) consumption. Moreover, with the assistance of the recognition information included in the visual information, the driver can recognize the depression amount which makes the gasoline engine drive. The visual information assists the driver in his/her driving maneuver in a way that the power source drives in the range which does not allow the gasoline engine to drive. For this reason, the driver can drive the vehicle without driving the gasoline engine, but by driving the power source while inhibiting the fuel (energy) consumption (that is to say, by driving the drive motor only).

The pedal reactive force controller according to the present invention is characterized in that the information transmission unit includes an efficiency display section for displaying second visual information, and puts more emphasis on a display of the second visual information in the efficiency display section as a length of time for which the depression amount is kept at the operation threshold value becomes longer.

According to the present invention, with the assistance of the display of the second visual information in the efficiency display section (the level of emphasis), the driver can recognize how long the depression amount is kept at the operation threshold value, and how long the power source is accordingly kept in the first state in which the amount of energy consumption is smaller. For this reason, the driver can keep the power source driving in the first state in which the amount of energy consumption is smaller for a longer time, and can keep driving the vehicle while inhibiting the energy consumption.

The pedal reactive force controller according to the present invention is characterized in that the information transmission unit includes the efficiency display section for displaying the second visual information, and puts more emphasis on the display of the second visual information in the efficiency display section as the depression amount becomes closer to the operation threshold value within a range below the operation threshold value.

According to the present invention, with the assistance of the display of the second visual information in the efficiency display section, the driver can visually recognize the depression amount which switches the power source to the second state in which the amount of energy consumption is larger. In addition, with the assistance of the amplification of the reaction force of the pedal by adding the reaction force, the driver can recognize that the power source is switched over to the second state. For these reasons, the visual sense (the second visual information) and the stimulus (the amplification of the reaction force of the pedal) assist the driver in his/her driving maneuver in a way that the power source drives efficiently.

The pedal reactive force controller according to the present invention is characterized in that the information transmission unit includes the efficiency display section for displaying the second visual information, and puts more emphasis on the display of the second visual information in the efficiency display section as the depression amount becomes closer to the operation threshold value from a range above the operation threshold value.

According to the present invention, with the assistance of the display of the second visual information in the efficiency display section, the driver can visually recognize that the depression amount becomes closer to the operation threshold value from the range above the operation threshold value. For example, even in a case where the driver depresses the pedal beyond the operation threshold value, the drive can securely reduce the depression amount to the operation threshold value based on the second visual information.

The pedal reactive force controller according to the present invention is characterized in that the power source includes: an electric motor for outputting the power while consuming electric power; and an internal combustion engine for outputting the power while consuming the energy, the first state is a state in which only the electric motor drives, and the second state is a state in which the internal combustion engine drives.

According to the present invention, in the case of the vehicle including the internal combustion engine and the electric motor as the power source, the driver can recognize that the state (first state) in which the vehicle runs by driving only the electric motor is switched over to the state (second state) in which the vehicle runs by driving the internal combustion engine, with the assistance of the amplification of the reaction force of the pedal by adding the reaction force, and the display in the operation amount display section. Thus, the driver can operate the pedal within the range which does not allow the power source to switch over to the state (second state) in which the internal combustion engine drives, and can drive the vehicle while inhibiting the energy consumption.

The pedal reactive force controller according to the present invention is characterized in that the power source includes: the electric motor for outputting the power while consuming electric power; and the internal combustion engine including a function of generating the electric power while consuming the energy, the first state is the state in which only the electric motor drives, and the second state is the state in which the internal combustion engine drives.

According to the present invention, in the case of the vehicle including the internal combustion engine and the electric motor as the power source, and configured to be capable of generating the electric power to be supplied to the electric motor by driving the internal combustion engine, the driver can recognize that the state (first state) in which the vehicle runs by driving only the electric motor is switched over to the state (second state) in which the electric power is generated by driving the internal combustion engine and the vehicle runs by driving the electric motor to which the electric power is supplied, with the assistance of the amplification of the reaction force of the pedal by adding the reaction force, and the display in the operation amount display section. Thus, the driver can operate the pedal within the range which does not allow the power source to switch over to the state (second state) in which the internal combustion engine drives, and can drive the vehicle while inhibiting the energy consumption.

The pedal reactive force controller according to the present invention is characterized in that the pedal is the accelerator pedal with which the driver adjusts the power, outputted from the power source of the vehicle, for driving the drive wheel, and the reaction force adding unit sets the operation threshold value at the depression amount which makes the power source drive with highest efficiency.

According to the present invention, while the power source is driving with the highest efficiency, the reaction force of the pedal is amplified by adding the reaction force. Thereby, with the assistance of the amplification of the reaction force of the pedal, the driver can recognize the depression amount which makes the efficiency of the power source becomes the highest, and can thus keep the depression amount. Furthermore, with the assistance of the recognition information included in the visual information, the driver can recognize the depression amount which makes the power source drive with the highest efficiency. Accordingly, the visual information assists the driver in his/her driving maneuver in a way that the power source drives with the highest efficiency. For this reason, the driver can drive the vehicle by driving the power source with the highest efficiency.

The pedal reactive force controller according to the present invention is characterized in that in a case where regardless of how large or small the depression amount is, the reaction force adding unit adds the reaction force to the pedal based on vehicle information, the information transmission unit designates all the operation amount display section as the second area for displaying the visual information inclusive of the second recognition information, and displays the visual information including the second recognition information in the operation amount display section.

According to the present invention, in the case where regardless of the depression amount of the pedal, the reaction force adding unit is configured to add the reaction force to the pedal based on the vehicle information, all the operation amount display section can be designated as the second area for displaying the visual information inclusive of the second recognition information. For this reason, the driver can visually recognize that the reaction force of the pedal is amplified by adding the reaction force based on the vehicle information, with the assistance of the display of the visual information including the same recognition information in all the operation amount display section. Furthermore, with the assistance of the display in the operation amount display section, the driver can visually recognize the depression amount of the pedal.

The pedal reactive force controller according to the present invention is characterized in that the pedal is the accelerator pedal with which the driver adjusts the power, outputted from the power source of the vehicle, for driving the drive wheel, and the reaction force adding unit sets the operation threshold value at the depression amount at which the power outputted from the power source causes the drive wheel to lose traction.

According to the present invention, with the assistance of the amplification of the reaction force of the pedal by adding the reaction force, the driver can recognize the depression amount which causes the drive wheel to lose traction (slip). For this reason, the driver can operate the pedal (acceleration pedal) within a range which does not allow the drive wheel to lose traction, and can drive the vehicle without allowing the drive wheel to slip over a low-friction road such as an icy-surface road. Furthermore, with the assistance of the recognition information included in the visual information, the driver can recognize the depression amount which does not allow the drive wheel to lose traction. Accordingly, the visual information assists the driver in his/her driving maneuver in a way that the drive wheel does not lose traction.

The pedal reactive force controller according to the present invention is characterized in that in a case where the reaction force adding unit is in a reaction-force addition stopping state in which the reaction force adding unit always adds no reaction force to the pedal regardless of how large or small the depression amount is, all the operation amount display section is designated as the first area, and the visual information including the first recognition information is displayed in the operation amount display section.

According to the present invention, while in the reaction-force addition stopping state in which no reaction force is always added to the pedal, all the operation amount display section is designated as the first area, and the visual information including the first recognition information is displayed in the operation amount display section. For this reason, with the assistance of the first recognition information displayed in the operation amount display section, the driver can recognize the occurrence of the reaction-force addition stopping state. Furthermore, with the assistance of the display in the operation amount display section, the driver can visually recognize the depression amount of the pedal.

The pedal reactive force controller according to the present invention is characterized in that in a case where the driver sets the vehicle not to run, the reaction force adding unit is in the reaction-force addition stopping state.

According to the present invention, when the vehicle is set not to run such as in a neutral mode, the reaction-force addition stopping state in which no reaction force is added to the pedal occurs. However, since all the operation amount display section is designated as the first area, and since the visual information including the first recognition information is displayed in the operation amount display section, the driver can visually recognize the depression amount of the pedal with the assistance of the display in the operation amount display section even if the vehicle is set not to run.

The pedal reactive force controller according to the present invention is characterized in that the pedal is the accelerator pedal with which the driver adjusts the power, outputted from the power source of the vehicle, for driving the drive wheel, and in a case where the driver sets the vehicle to run backward, the visual information including the first recognition information is displayed in the first area while the depression amount is less than the operation threshold value, and the visual information including the second recognition information is displayed in the second area while the depression amount is greater than the operation threshold value.

According to the present invention, when the vehicle is set to run backward such as in a reverse mode, the visual information including the first recognition information is displayed in the first area while the depression amount is less than the predetermined operation threshold value, and the visual information including the second recognition information is displayed in the second area while the depression amount is greater than the predetermined operation threshold value.

For this reason, when driving the vehicle backward, too, the driver can visually recognize whether or not the reaction force is added to the pedal, and what relationship exists between the depression amount of the pedal and the reaction force of the pedal, with the assistance of the visual information displayed in the operation amount display section.

Advantageous Effects of Invention

According to the present invention, it is possible to provide a pedal reactive force controller which includes information transmission means capable of showing the driver a relationship between an amount of pedal depression and a change in reaction force of a pedal in the form of visual information.

BRIEF DESCRIPTION OF DRAWINGS

FIG. 1A is a schematic diagram of a pedal reactive force controller of an embodiment, and FIG. 1B is a diagram showing a reaction force state display unit provided to a pedal device.

FIGS. 5A to 5E are diagrams showing how luminance of an eco-state display area changes with time; FIG. 5A shows a first stage; FIG. 5B shows a second stage; FIG. 5C shows a third stage; FIG. 5D shows a fourth stage; and FIG. 5E shows a fifth stage.

FIGS. 6A to 6E are diagrams showing how the luminance of the eco-state display area changes with time; FIG. 6A shows a state in which the luminance of the eco-state display area is highest; FIG. 6B shows a state in which the luminance of the eco-state display area is slightly lower; FIG. 6C shows a state in which the luminance of the eco-state display area is much lower; FIG. 6D shows a state in which the luminance of the eco-state display area is lowest; and FIG. 6E shows a state in which the eco-state display area is made to halt light emission.

DESCRIPTION OF EMBODIMENTS

Figure 2:
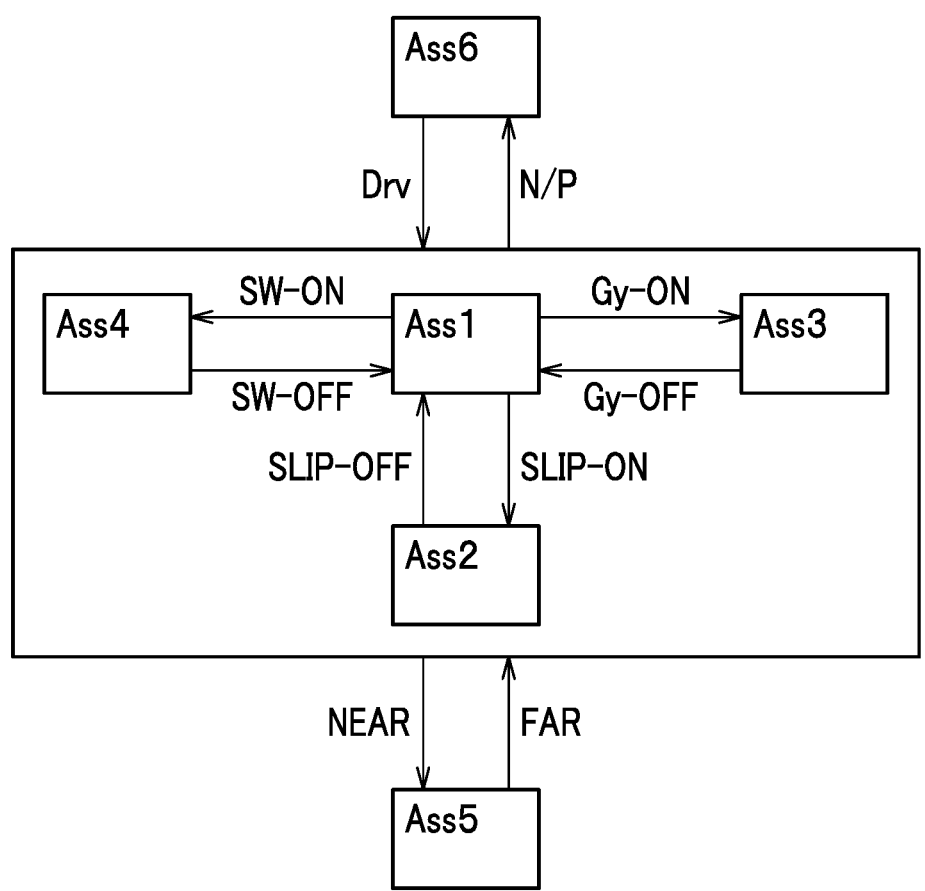
FIG. 2 is a diagram showing how the ECU switches among an eco-drive assistance, a slip prevention assistance, a sport-drive assistance, a cornering assistance, a collision avoidance assistance and an add-on reaction force OFF control.

Hereinafter, an embodiment of the present invention will be described in detail with reference to the accompanying drawings depending on the necessity.

FIG. 1A is a schematic diagram of a pedal reactive force controller of an embodiment, and FIG. 1B is a diagram showing a reaction force state display unit provided to a pedal device.

The pedal reactive force controller 9 of the embodiment includes the reaction force state display unit 1, a pedal (accelerator pedal 2), a stroke sensor 3 configured to detect an amount of depression of the accelerator pedal 2 (an accelerator operation amount SL).

The accelerator pedal 2 is configured to automatically return to a predetermined reference position with the assistance of biasing means (a return spring or the like), albeit not illustrated. The biasing means constantly applies predetermined reaction force (pedal reaction force Pp) to the accelerator pedal 2.

The pedal reactive force controller 9 further includes a reaction force generator 4 configured to amplify the pedal reaction force Pp of the accelerator pedal 2. The reaction force generator 4 includes an electric motor (a reaction force motor 4b), and a reaction force arm 4a configured to transmit torque produced by the reaction force motor 4b to the accelerator pedal 2. The reaction force motor 4b is controlled by an ECU (Electronic Control Unit) 5.

The reaction force generator 4 of the embodiment is a reaction force generator configured to generate reaction force (hereinafter referred to as "add-on reaction force Pa"), and to amplify the pedal reaction force Pp applied by the biasing means to the accelerator pedal 2 by adding the generated add-on reaction force Pa to the pedal reaction force Pp.

The reaction force generator 4 is, for example, configured to add the add-on reaction force Pa to the pedal reaction force Pp by inputting the torque of the reaction force arm 4a turned by the reaction force motor 4b into the accelerator pedal 2 in a way that the torque hinders the driver from depressing the accelerator pedal 2, albeit not limited to this configuration. For this reason, as the torque produced by the reaction force motor 4b becomes larger, larger add-on reaction force Pa is added to the pedal reaction force Pp, and the pedal reaction force Pp accordingly becomes larger.

It should be noted that the reaction force generator 4 is configured to quickly add the add-on reaction force Pa to the pedal reaction force Pp, for example. If the add-on reaction force Pa is added to the pedal reaction force Pp slowly, a stimulus felt by the driver becomes weak. This makes it difficult for the driver to recognize the addition of the add-on reaction force Pa to the pedal reaction force Pp, that is to say, an increase in the pedal reaction force Pp of the accelerator pedal 2. When the add-on reaction force Pa is added to the pedal reaction force Pp quickly, the pedal reaction force Pp of the accelerator pedal 2 increases steeply and stepwise. This gives a strong stimulus to the driver. Thereby, the driver can easily recognize the increase in the pedal reaction force Pp of the accelerator pedal 2.

Otherwise, the reaction force generator 4 may be configured to slowly add the add-on reaction force Pa to the pedal reaction force Pp. If the reaction force generator 4 is configured like this, the pedal reaction force Pp of the accelerator pedal 2 does not change steeply. This eases the driver's feeling of uneasiness.

The reaction force generator 4 may be set either for the quick addition of the add-on reaction force Pa to the pedal reaction force Pp, or for the slow addition, for example based on the vehicle's performance requirements, albeit not illustrated, depending on the necessity.

Alternatively, the reaction force generator 4 may be configured such that the driver can choose between the quick addition of the add-on reaction force Pa to the pedal reaction force Pp and the slow addition by manipulating a switch or the like.

In addition, the ECU 5 of the embodiment calculates the add-on reaction force Pa depending on the necessity after executing one of "eco-drive assistance," "slip prevention assistance," "sport-drive assistance," "cornering assistance" and "collision avoidance assistance," as well as controls the reaction force motor 4b to add the calculated add-on reaction force Pa to the pedal reaction force Pp.

To this end, the ECU 5 includes an eco assistance reaction force calculator 50 (Cal. 1), a slip prevention reaction force calculator 51 (Cal. 2), a sport-mode reaction force calculator 52 (Cal. 3), a lateral g-force assistance reaction force calculator 53 (Cal. 4), and a collision avoidance reaction force calculator 54 (Cal. 5). In addition, the ECU 5 is configured to receive measurement signals from a radar system 60 (Sens. 1), an acceleration sensor 61 (Sens. 2), a wheel speed sensor 62 (Sens. 3) and a steering angle sensor 63 (Sens. 4).

The ECU 5 further includes a sport-drive changeover switch 64 (SW1). The sport-drive changeover switch 64 is a manipulation member to be manipulated by the driver. When a changeover signal Sig received from the sport-drive changeover switch 64 is a signal representing "ON," the ECU 5 executes the sport-drive assistance. On the other hand, when the changeover signal Sig received from the sport-drive changeover switch 64 is a signal representing "OFF," the ECU 5 stops executing the sport-drive assistance.

The ECU 5 executes the eco-drive assistance to assist the driver in his/her driving maneuver, thereby driving a power source (a gasoline engine, a drive motor or the like), albeit not illustrated, of the vehicle at high efficiency (with low fuel consumption, or the like). The ECU 5 assists the driver in his/her driving maneuver, for example, to run the vehicle at the highest efficiency of the power source.

In addition, the ECU 5 executes the slip prevention assistance to assist the driver in his/her driving maneuver, thereby preventing loss of traction (slip) of driven wheels due to excessive torque during the drive on a low-friction road such as an icy-surface road, and during the start.

Furthermore, the ECU 5 executes the sport-drive assistance, and thereby assists the driver in depressing the accelerator pedal 2 quickly.

During the sport drive, the driver needs to run the vehicle with agility by quickly depressing the accelerator pedal 2. For this reason, the ECU 5 executes the sport-drive assistance, and thereby assists the driver in depressing the accelerator pedal 2 quickly.

Moreover, when the vehicle runs through a curve or the like, large acceleration in a lateral direction (lateral acceleration) is applied to the vehicle. In that case, the ECU 5 executes the cornering assistance to assist the driver in his/her driving maneuver, thereby enhancing the running stability of the vehicle.

Besides, if an obstacle (a building, a preceding vehicle or the like) is ahead of the driver's vehicle in a run, the ECU 5 executes the collision avoidance assistance to assist the driver in his/her driving maneuver, thereby avoiding a collision of the vehicle with the obstacle. The collision avoidance assistance executed by the ECU 5 is to assist the driver in his/her driving maneuver based on vehicle information about the presence of an obstacle ahead.

The radar system 60 measures a distance between the driver's vehicle and the obstacle ahead, and inputs a distance signal Sig1 representing the measured distance into the ECU 5. Based on the distance signal Sig1, the ECU 5 obtains the distance between the driver's vehicle and the obstacle ahead.

The radar system 60 may be configured to measure the distance between the driver's vehicle and the obstacle ahead, for example, based on an amount of time it takes for a beam of infrared light emitted ahead of the driver's vehicle to return to the vehicle after being reflected off the obstacle ahead, albeit not limited to this configuration.

It should be noted that the pedal reactive force controller may include an image capturing device (albeit not illustrated), such as a camera, configured to capture images of the circumstance ahead of the driver's vehicle, instead of the radar system 60. Furthermore, the image capturing device may be configured to measure the distance between the vehicle and the obstacle, for example, using an autofocusing function.

The acceleration sensor 61 detects accelerations (front-rear acceleration and lateral acceleration) applied to the vehicle, and inputs an acceleration signal Sig2 representing the detected accelerations into the ECU 5. Based on the acceleration signal Sig2, the ECU 5 calculates the accelerations (front-rear acceleration and lateral acceleration) applied to the vehicle.

The wheel speed sensor 62 detects a wheel speed of the vehicle, and inputs a wheel speed signal Sig3 representing the detected wheel speed into the ECU 5. Based on the wheel speed signal Sig3, the ECU 5 calculates a speed of the vehicle (a vehicle speed).

The steering angle sensor 63 detects a steering angle of a steering wheel (for example, a front wheel) of the vehicle, and inputs a steering angle signal Sig4 representing the detected steering angle into the ECU 5. Based on the steering angle signal Sig4, the ECU 5 calculates the steering angle of the vehicle (the steering angle of the steering wheel).

The ECU 5 further receives an operation amount signal Sig5 from the stroke sensor 3. Based on the operation amount signal Sig5, the ECU 5 calculates the amount of depression of the accelerator pedal 2 (the accelerator operation amount SL).

The functions of the respective reaction force calculators (50 to 54) are implemented by the execution of predetermined programs by a CPU (Central Processing Unit), albeit not illustrated, of the ECU 5. Thus, each of the reaction force calculators (50 to 54) appropriately calculates the add-on reaction force Pa according to conditions of the vehicle (albeit not illustrated).

The ECU 5 further includes a display controller 56 (Output2) and a target reaction force output unit 55 (Output1).

The target reaction force output unit 55 outputs a control signal (a motor drive signal Ctl1) for controlling the reaction force motor 4b in order for the reaction force motor 4b to produce the torque enabling the add-on reaction force Pa calculated by each of the reaction force calculators (50 to 54) to be added to the pedal reaction force Pp.

The display controller 56 outputs a control signal (a display signal Ctl2) for controlling the reaction force state display unit 1 based on the add-on reaction force Pa calculated by each of the reaction force calculators (50 to 54) and the accelerator operation amount SL.

Furthermore, the pedal reactive force controller 9 of the embodiment includes the information transmission unit (the reaction force state display unit 1) configured to showing the driver the add-on reaction force Pa to be added to the pedal reaction force Pp and the accelerator operation amount SL in the form of visual information by displaying the add-on reaction force Pa and the accelerator operation amount SL using light emission. The reaction force state display unit 1 is controlled by the ECU 5.

It is desirable that as shown in FIG. 1A, the reaction force state display unit 1 be disposed in a place enabling the reaction force state display unit 1 to be seen from the driver, such as in a place near a speedometer 70. Furthermore, it is desirable that the reaction force state display unit 1 be configured to be capable of visually showing the accelerator operation amount SL and the like using a combination of segments formed from light-emitting bodies such as organic EL (Electro-Luminescent) devices.

As shown in FIG. 1B, the reaction force state display unit 1 includes, for example, an operation amount display section 10, an efficiency display section 11, a range display section 12, a TCS (traction control system) icon 13, an OFF icon 14 and a pedal icon 15.

The operation amount display section 10 includes multiple segments arranged therein in an arc associated with the turn of the pedal, and shows the accelerator operation amount SL using light emission from the multiple segments. In other words, the operation amount display section 10 is a display section for displaying how the accelerator operation amount SL is large in the form of the number of light-emitting segments. It is desirable that the operation amount display section 10 be formed from eight or more segments. In this embodiment, the operation amount display section 10 is formed from 14 segments.

It should be noted that the operation amount display section 10 is formed from the 14 segments including a first segment 10a, a second segment 10b, a third segment 10c, a fourth segment 10d, a fifth segment 10e, a sixth segment 10f, a seventh segment 10g, an eighth segment 10h, a ninth segment 10i, a tenth segment 10j, an 11th segment 10k, a 12th segment 10l, a 13th segment 10m and a 14th segment 10n.

The efficiency display section 11 is formed from a segment shaped like an arc which is associated with the turn of the pedal, and displays how efficient the power source, albeit not illustrated, is in the form of a change in a light-emitting area, a change in color of the light emission, a change in luminescence brightness, and the like. It is desirable that the efficiency display section 11 be disposed along an inner periphery of the arc in which the segments of the operation amount display section 10 are arranged, in a way that the efficiency display section 11 are adjacent to all the segments (the first segment 10a to the 14th segment 10n) of the operation amount display section 10.

The range display section 12 is a display section formed from a sector-shaped segment (organic EL device or the like), and displays the accelerator operation amount SL for which to produce the pedal reaction force Pp in the form of a sector.

It is desirable that the range display section 12 be disposed along an inner periphery of the efficiency display section 11 shaped like an arc, and in a way that the range display section 12 is adjacent to the efficiency display section 11.

The TCS icon 13 is an icon for informing the driver of a reason why the ECU 5 produces the add-on reaction force Pa (in the embodiment, the ECU 5's execution of assistance using the TCS (traction control system), which will be described later). The OFF icon 14 is an icon for informing the driver that the ECU 5 is producing no add-on reaction force Pa (that is to say, the reaction force generator 4 is in a reaction-force addition stopping state in which the reaction force generator 4 adds no add-on reaction force Pa to the pedal reaction force Pp). It is desirable that the TCS icon 13 and the OFF icon 14 be each formed from a light-emitting body such as an organic EL device or a light-emitting diode.

In addition, the pedal icon 15 is an icon which the driver easily associates with the turn of the pedal (the turn of the accelerator pedal 2 in response to the driver's depression) in cooperation with the arc-shaped forms of the operation amount display section 10, the efficiency display section 11 and the range display section 12. The pedal icon 15 may be formed from a light-emitting body such as an organic EL device or a light-emitting diode, or from a pictogram in ink or the like.

The operation amount display section 10 is configured such that: as the accelerator operation amount SL increases, a more number of segments emit light sequentially from the first segment 10a to 14th segment 10n; and as the accelerator operation amount SL decreases, a more number of segments stop emitting light sequentially towards the first segment 10a.

Detailed descriptions will be later provided for what each of the efficiency display section 11, the range display section 12, the TCS icon 13 and the OFF icon 14 displays and how.

FIG. 2 is a diagram showing how the ECU switches among the eco-drive assistance, the slip prevention assistance, the sport-drive assistance, the cornering assistance, the collision avoidance assistance, and the add-on reaction force OFF control.

When the vehicle (not illustrated) starts, the ECU 5 executes the eco-drive assistance (Ass1). For example, when the vehicle is set to run forward with a transmission (automatic transmission), albeit not illustrated, set in a drive mode, or when the vehicle is set to run backward with the transmission set in a reverse mode, the ECU 5 executes the eco-drive assistance (Ass1).

In addition, if the ECU 5 judges that the vehicle is running on a slippery road surface (SLIP-ON) using a well-known technique (for example, a technique disclosed in Japanese Patent Application Publication No. 2013-112192), the ECU 5 executes the slip prevention assistance (Ass2). Incidentally, if while executing the slip prevention assistance (Ass2), the ECU 5 judges that the vehicle completes running on the slippery road surface (SLIP-OFF), the ECU 5 executes the eco-drive assistance (Ass1).

If while executing the eco-drive assistance (Ass1), the ECU 5 judges that lateral acceleration (Gy) equal to or greater than a predetermined value is applied to the vehicle (Gy-ON), the ECU 5 executes the cornering assistance (Ass3). Furthermore, if while executing the cornering assistance (Ass3), the ECU 5 judges that the lateral g-force is no longer applied to the vehicle (Gy-OFF), the ECU 5 executes the eco-drive assistance (Ass1).

When the driver manipulates the sport-drive changeover switch 64 (see FIG. 1A) so that a changeover signal SigSW representing "ON" is inputted into the ECU 5 (or when SW-ON), the ECU 5 executes the sport-drive assistance (Ass4). Thereafter, if while executing the sport-drive assistance (Ass4), the driver manipulates the sport-drive changeover switch 64 so that a changeover signal SigSW representing "OFF" is inputted into the ECU 5 (of when SW-OFF), the ECU 5 executes the eco-drive assistance (Ass1).

Moreover, when the ECU 5 judges that the distance between the driver's vehicle (albeit not illustrated) and the obstacle (a building, a preceding vehicle or the like) ahead becomes shorter than a predetermined value (or when NEAR) based on the distance signal Sig1, the ECU 5 executes the collision avoidance assistance (Ass5). Thereafter, if while executing the collision avoidance assistance (Ass5), the ECU 5 judges that the distance between the driver's vehicle and the obstacle ahead becomes longer than the predetermined value (or when FAR), the ECU 5 returns the mode of execution to a mode executed just before the collision avoidance assistance (Ass5) (that is to say, the eco-drive assistance (Ass1), the slip prevention assistance (Ass2), the cornering assistance (Ass3), or the sport-drive assistance (Ass4).

Besides, when the vehicle (albeit not illustrated) is set not to run with the transmission (automatic transmission), albeit not illustrated, set in a neutral mode or a parking mode (or when N/P), the ECU 5 executes the add-on reaction force OFF control (Ass6). Thereafter, if while executing the add-on reaction force OFF control (Ass6), the transmission is set into a mode other than the neutral mode and the parking mode, that is to say, a mode such as the drive mode or the reverse mode (or if Drv), the ECU 5 returns the mode of execution to a mode executed just before the add-on reaction force OFF control (that is to say, the eco-drive assistance (Ass1), the slip prevention assistance (Ass2), the cornering assistance (Ass3), or the sport-drive assistance (Ass4). Once the ECU 5 executes the add-on reaction force OFF control (Ass6), no add-on reaction force Pa is added to the pedal reaction force Pp. In other words, once the ECU 5 executes the add-on reaction force OFF control, the reaction force generator 4 enters the reaction-force addition stopping state.

It should be noted that the configuration is made such that when the vehicle (albeit not illustrated) is set to run backward with the transmission (albeit not illustrated) set in the reverse mode, the ECU 5 executes the add-on reaction force OFF control (Ass6), and the reaction force generator 4 thus enters the reaction-force addition stopping state.

As shown in FIG. 2, the ECU 5 executes the eco-drive assistance (Ass1), the slip prevention assistance (Ass2), the cornering assistance (Ass3), the sport-drive assistance (Ass4) and the collision avoidance assistance (Ass5), as well as thereby makes the reaction force generator 4 appropriately produce the add-on reaction force Pa depending on the condition under each assistance. Furthermore, depending on each condition, the ECU 5 displays how large the accelerator operation amount SL is, and what amount of add-on reaction force Pa is added to the pedal reaction force Pp, on the reaction force state display unit 1 (see FIG. 1A).

In addition, when the transmission (albeit not illustrated) is set into the neutral mode or the like, the ECU 5 executes the add-on reaction force OFF control, and stops adding the add-on reaction force Pa to the pedal reaction force Pp.

Descriptions will be hereinbelow provided for: how the ECU 5 calculates the add-on reaction force Pa for each of the eco-drive assistance, the slip prevention assistance, the sport-drive assistance, the cornering assistance, the collision avoidance assistance and the add-on reaction force OFF control; and how the reaction force state display unit 1 displays what.

<<Eco-Drive Assistance>>

Figure 3:
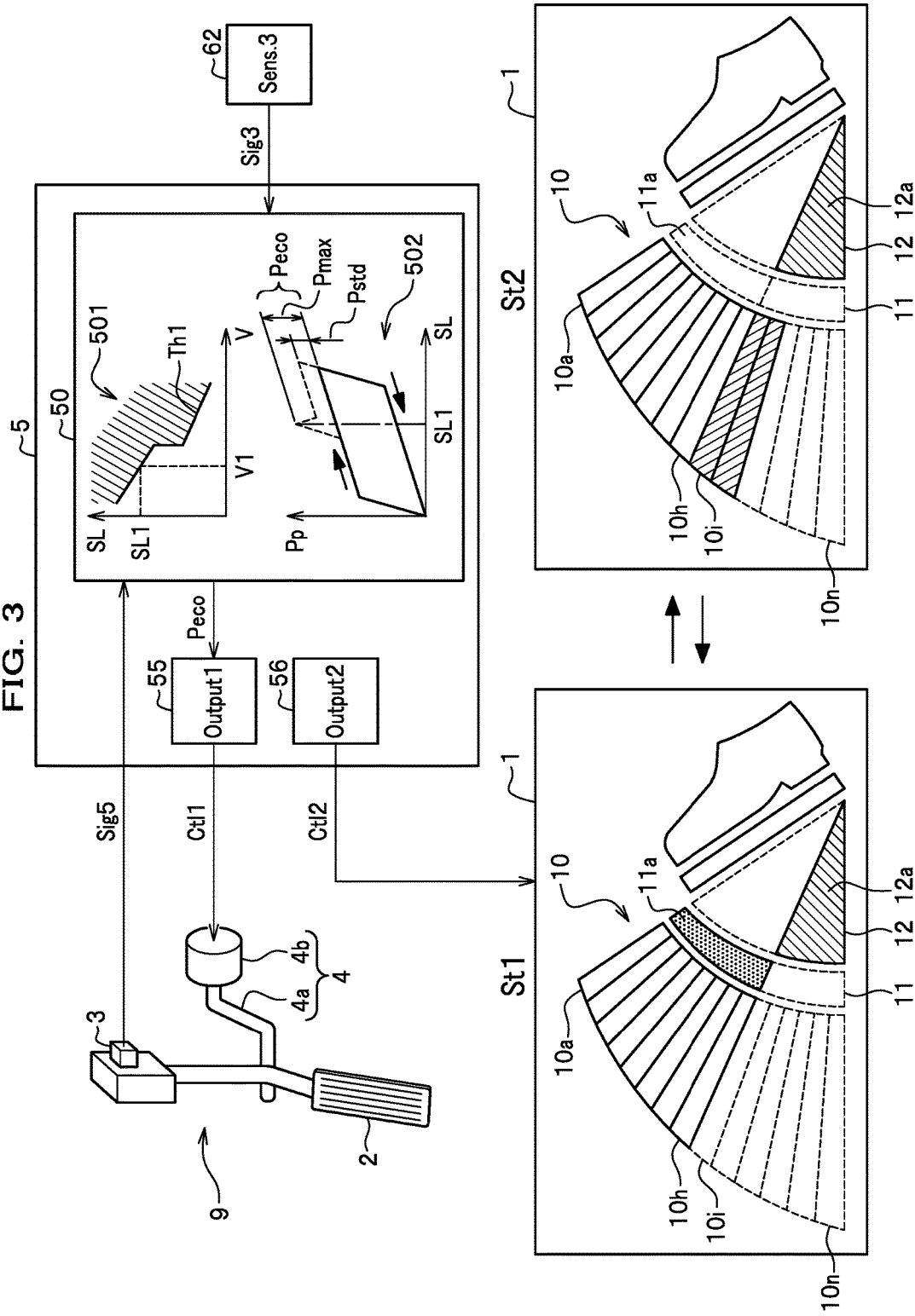
FIG. 3 is a diagram showing what state the reaction force state display unit is in when the ECU executes the eco-drive assistance.
Figure 4A:
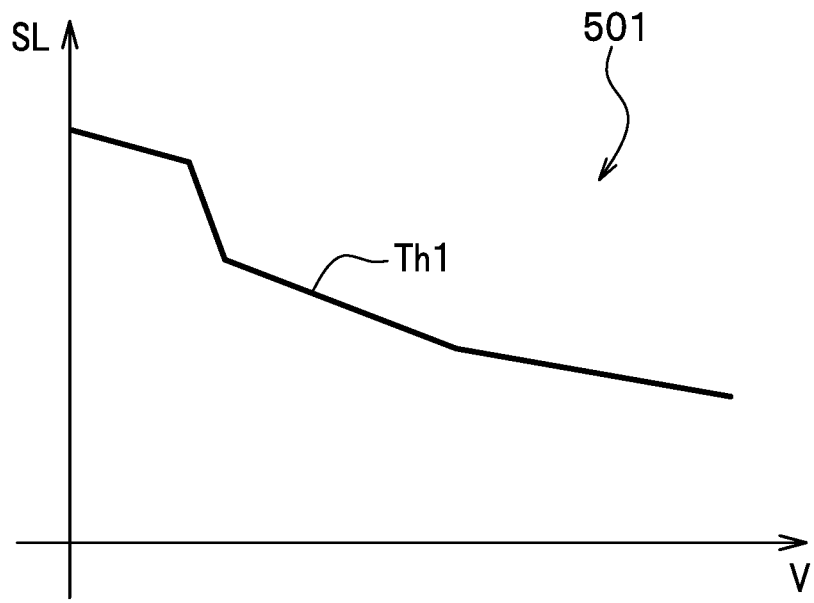
FIG. 4A is a diagram showing an example of a threshold operation amount in a case where a power source is a gasoline engine.
Figure 4B:
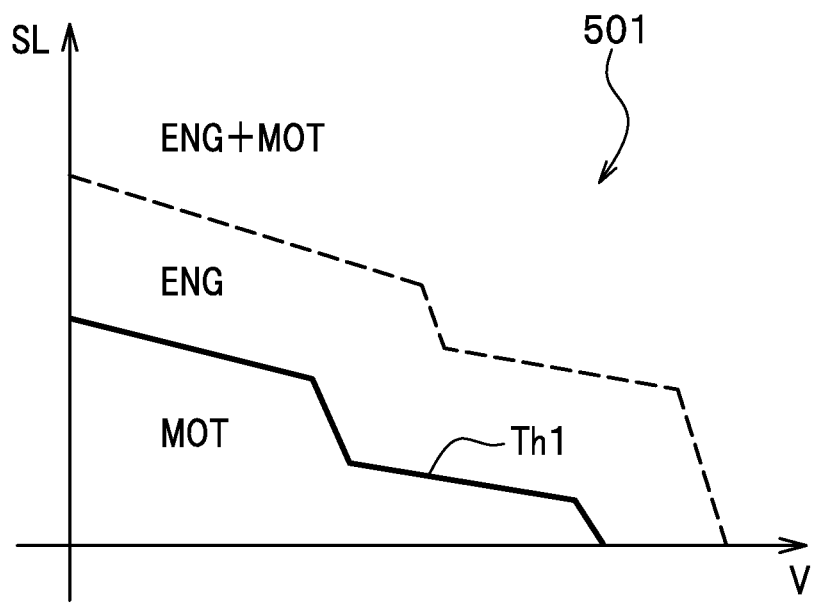
FIG. 4B is a diagram showing an example of the threshold operation amount in a case where the power source hybrid-drives using the gasoline engine and a drive motor.

FIG. 3 is a diagram showing how the reaction force state display unit works when the ECU executes the eco-drive assistance. Furthermore, FIG. 4A is a diagram showing an example of a threshold operation amount to be applied in a case where the power source is a gasoline engine, and FIG. 4B is a diagram showing an example of a threshold operation amount to be applied in a case where a hybrid drive is realized using a gasoline engine and a drive motor as the power source. In addition, FIGS. 5A to 5E are diagrams each showing how the luminance of an eco-condition display area changes with time: FIG. 5A shows a first stage of the change in the luminance; FIG. 5B shows a second stage of the change in the luminance; FIG. 5C shows a third stage of the change in the luminance; FIG. 5D shows a fourth stage of the change in the luminance; and FIG. 5E shows a fifth stage of the change in the luminance. Moreover, FIGS. 6A to 6E are diagrams each showing how the luminance of an eco-condition display area changes; FIG. 6A shows a highest luminance of the eco-condition display area; FIG. 6B shows a slightly lower luminance of the eco-condition display area; FIG. 6C shows a further lower luminance of the eco-condition display area; FIG. 6D shows a lowest luminance of the eco-condition display area; and FIG. 6E shows the eco-condition display area where light emission is stopped. Incidentally, a state St1 of the reaction force state display unit 1 shown in FIG. 3 is a state where the accelerator operation amount SL is less than the threshold operation amount Th1, and a state St2 of the reaction force state display unit 1 shown in FIG. 3 is a state where the accelerator operation amount SL is greater than the threshold operation amount Th1.

To execute the eco-drive assistance, the ECU 5 calculates eco add-on reaction force Peco (add-on reaction force Pa for the eco-drive assistance) using the eco assistance reaction force calculator 50, and controls the reaction force motor 4b using the target reaction force output unit 55 in a way that produces the thus-calculated eco add-on reaction force Peco. In addition, the display controller 56 of the ECU 5 controls the reaction force state display unit 1 in way that the occurrence of the thus-calculated eco add-on reaction force Peco is displayed depending on accelerator operation amount SL.

The eco assistance reaction force calculator 50 calculates the vehicle speed (V) based on the wheel speed signal Sig3 received from the wheel speed sensor 62, and the accelerator operation amount SL based on the operation amount signal Sig5 received from the stroke sensor 3. Thereafter, referring to an eco assistance map 501 set in advance, the eco assistance reaction force calculator 50 judges whether to produce the eco add-on reaction force Peco, from the thus-calculated vehicle speed V and the accelerator operation amount SL.

If the eco assistance reaction force calculator 50 judges that the eco add-on reaction force Peco should be produced, the eco assistance reaction force calculator 50 calculates the eco add-on reaction force Peco, and inputs the resultant eco add-on reaction force Peco into the target reaction force output unit 55. The target reaction force output unit 55 outputs the motor drive signal Ctl1 in order for the reaction force motor 4b to produce torque for adding the eco add-on reaction force Peco calculated by the eco assistance reaction force calculator 50 to the pedal reaction force Pp.

The eco assistance map 501 is a map which is set in advance depending on the performance and the like of the vehicle (albeit not illustrated). In the eco assistance map 501, for each of the vehicle speed V, a range is set for the accelerator operation amount SL (for example, a hatched range in FIG. 3) such that while the accelerator operation amount SL is in the range, the eco add-on reaction force Peco is produced.

The eco assistance map 501 is a map in which for each of the vehicle speed V, the accelerator operation amount SL which increases the efficiency of the power source (albeit not illustrated) and accordingly maximizes the running efficiency of the vehicle (for example, which enables the vehicle to efficiently run with the least fuel consumption) is shown as the threshold operation amount Th1.

In addition, in the eco assistance map 501, a range of the accelerator operation amount SL (that is to say, the hatched range in FIG. 3) which is above the threshold operation amount Th1 determined as the characteristic value represents a range where the efficiency of the power source decreases. In other words, the threshold operation amount Th1 represents a threshold value of the accelerator operation amount SL (that is to say, an operation threshold value) at which the efficiency of the power source starts to decrease. The threshold operation amount Th1 like this represents the accelerator operation amount SL which maximizes the efficiency of the power source for each of the vehicle speed V. The threshold operation amount Th1 is set for each of the vehicle speed V. The threshold operation amount Th1 along continuum corresponding to the vehicle speed V is shown in the eco assistance map 501.

For example, in the case where the power source of the vehicle (albeit not illustrated) is a gasoline engine, in the eco assistance map 501, the accelerator operation amount SL which makes the fuel economy become the best and drives the power source (the gasoline engine) at the highest efficiency is set as the threshold operation amount Th1, as shown in FIG. 4A.

Meanwhile, in the case where the power source of the vehicle is formed from a gasoline engine and a drive motor (in the case where the power source performs the hybrid drive), an amount of gasoline (energy) consumption is inhibited while the vehicle is running by driving the drive motor (that is to say, in a first condition (MOT)). For this reason, the gasoline fuel economy is better in the first condition (MOT) in which the vehicle is running by driving only the drive motor than in a second condition (ENG) in which the vehicle is running by driving the gasoline engine, and in the other second condition (ENG+MOT) in which the vehicle is running by driving the gasoline engine and the drive motor. However, the outputted power is smaller in the first condition (MOT) in which the vehicle is running by driving only the drive motor than in the second condition (ENG, or ENG+MOT) in which the vehicle is running by driving the gasoline engine.

With this taken into consideration, the configuration is made such that the first condition (MOT) in which the vehicle is running by driving only the drive motor, and the second condition (ENG, or ENG+MOT) in which the vehicle is running by driving the gasoline engine are appropriately alternated according to the accelerator operation amount SL.

To this end, in the case where the power source (albeit not illustrated) of the vehicle is formed from the gasoline engine and the drive motor, the threshold operation amount Th1 is set as the accelerator operation amount SL corresponding to a boundary between the first condition (MOT) in which the vehicle is running by driving only the drive motor and the second condition (ENG, or ENG+MOT) in which the vehicle is running by driving the gasoline engine, as shown in FIG. 4B.

In other words, the threshold operation amount Th1 is set as the accelerator operation amount SL at which the first condition in which only the drive motor is driven (that is to say, the condition under which the gasoline consumption is inhibited) is switched over to the second condition in which the gasoline engine is driven (that is to say, the condition under which the gasoline is consumed).

As described above, the threshold operation amount Th1 is set as appropriate according to the type and structure of the power source of the vehicle. Furthermore, the first and second conditions of the power source are divided based on how much the energy is consumed to generate the driving force. For example, a condition under which an amount of energy consumption is equal to or greater than a predetermined value is divided as the second condition, while a condition under which an amount of energy consumption is less than that in the second condition, or a condition under which no energy is consumed, is divided as the first condition. In other words, the first condition is a condition under which the amount of energy consumption is smaller or no energy is consumed, while the second condition is a condition under which the amount of energy consumption is larger. In the case shown in FIG. 4B, the first condition is a condition under which only the drive motor is driven so that no energy is consumed to generate the driving force, while the second condition is a condition under which the gasoline engine is driven so that the energy (gasoline) is consumed.

It should be noted that the energy differs depending on the types of the power source. For example, in a case where the power source is a gasoline engine, the energy is gasoline. Meanwhile, in a case where the power source is fuel cells, the energy is hydrogen. Furthermore, in a case where the power source is an electric motor, the energy is electricity.

The eco assistance reaction force calculator 50 refers to the eco assistance map 501 depending on the calculated vehicle speed V and the accelerator operation amount SL. If the accelerator operation amount SL is greater than the threshold operation amount Th1 corresponding to the current vehicle speed V, the eco assistance reaction force calculator 50 judges that the eco add-on reaction force Peco should be generated.

Furthermore, based on an add-on reaction force map 502 shown in FIG. 3, the eco assistance reaction force calculator 50 calculates the eco add-on reaction force Peco. Incidentally, in the add-on reaction force map 502 shown in FIG. 3, a solid line represents the pedal reaction force Pp which the biasing means applies to the accelerator pedal 2, while a dashed line represents the eco add-on reaction force Peco which the reaction force generator 4 adds to the pedal reaction force Pp.

The eco assistance reaction force calculator 50 monitors the accelerator operation amount SL by monitoring the operation amount signal Sig5. When the accelerator operation amount SL exceeds the threshold operation amount Th1 on the eco assistance map 501, the eco assistance reaction force calculator 50 calculates an instantaneously large eco add-on reaction force Peco (whose magnitude is denoted by reference sign Pmax). For example, if the threshold operation amount Th1 is at SL1 when the vehicle speed V is at V1, the eco assistance reaction force calculator 50 calculates the eco add-on reaction force Peco (with the magnitude Pmax) which is the largest when the accelerator operation amount SL is at SL1.

As described above, when the accelerator operation amount SL exceeds the threshold operation amount Th1, the instantaneously large eco add-on reaction force Peco is generated and added to the pedal reaction force Pp. Thereby, the pedal reaction force Pp of the accelerator pedal 2 increases steeply and stepwise, and the large stimulus can be given to the driver.

Thereafter, when the accelerator pedal 2 is further depressed and the accelerator operation amount SL thus increases, the eco assistance reaction force calculator 50 calculates a standard eco add-on reaction force Peco (whose magnitude is denoted by reference sign Pstd). Incidentally, the magnitude (Pstd) of the standard eco add-on reaction force Peco to be calculated by the eco assistance reaction force calculator 50 while in the eco-drive assistance mode may take on a value which is set as appropriate depending on the driving performance or the like required for the vehicle (albeit not illustrated).

Subsequently, the target reaction force output unit 55 of the ECU 5 outputs the motor drive signal Ctl1 for the reaction force motor 4b to produce the torque for adding the eco add-on reaction force Peco, which is calculated by the eco assistance reaction force calculator 50, to the pedal reaction force Pp.

Moreover, of the 14 segments (the first segment 10a to the 14th segment 10n) included in the operation amount display section 10, the first segment 10a to the eighth segment 10h are designated as "eco segments" by the display controller 56, and the ninth segment 10i to the 14th segment 10n are designated as "non-eco segments" by the display controller 56. Thereby, the operation amount display section 10 is divided into an area (first area) where the eco segments are arranged and an area (second area) where the non-eco segments are arranged.

It should be noted that although in the embodiment, the first segment 10a to the eighth segment 10h are designated as the eco segments, no restriction is imposed on the number of eco segments or the number of non-eco segments.

The first segment 10a to the eighth segment 10h designated as the eco segments are segments used to display the accelerator operation amount SL in a range below the threshold operation amount Th1. Each segment corresponds to one of eight parts into which the range below the threshold operation amount Th1 is divided. While the accelerator operation amount SL is less than the threshold operation amount Th1, no eco add-on reaction force Peco is produced. For this reason, the eco segments serve as the segments used to display the accelerator operation amount SL which does not cause the eco add-on reaction force Peco to be produced.

Furthermore, the ninth segment 10i to the 14th segment 10n designated as the non-eco segments are segments used to display the accelerator operation amount SL in a range above the threshold operation amount Th1. Each segment corresponds to one of six parts into which the range above the threshold operation amount Th1 is divided.

While the accelerator operation amount SL is greater than the threshold operation amount Th1, the eco add-on reaction force Peco is produced. For this reason, the non-eco segments serve as the segments used to display the accelerator operation amount SL which causes the eco add-on reaction force Peco to be produced.

Moreover, the display controller 56 makes the segments (the first segment 10a to the 14th segment 10n) in the operation amount display section 10 emit light according to the accelerator operation amount SL. In that case, the display controller 56 makes the eco segments (the first segment 10a to the eighth segment 10h) emit light in a predetermined first color (for example, white), and makes the non-eco segments (the ninth segment 10i to the 14th segment 10n) emit light in a second color (blue) which is different from the first color (white). In FIG. 3 (St1), in the operation amount display section 10, segments each surrounded by a solid line and shown in white emit light in white, and the other segments each surrounded by a dashed line emit no light. On the other hand, in FIG. 3 (St2), in the operation amount display section 10, segments each surrounded by a solid line and shown in white emit light in white; other segments each surrounded by a solid line and hatched emit light in blue; and the other segments each surrounded by a dashed line emit no light.

In addition, the display controller 56 designates a sector-shaped area in the range display section 12, which is adjacent to the non-eco segments in the operation amount display section 10, as a non-eco area 12a, and makes the non-eco area 12a emit light in the second color (for example, blue). In FIG. 3 (St1, St2), in the range display section 12, a hatched part surrounded by a solid line is designated as the non-eco area 12a, and emits light in blue; and the other part surrounded by a dashed line emits no light.

Furthermore, the display controller 56 sets an eco state display area 11a in the efficiency display section 11. To put it concretely, the display controller 56 designates a part of the efficiency display section 11, which is adjacent to the eco segments (the first segment 10a to the eighth segment 10h) in the operation amount display section 10, as the eco state display area 11a. In FIG. 3 (St1), in the efficiency display section 11, a meshed part surrounded by a solid line is designated as the eco state display area 11a.

As described above, the reaction force state display unit 1 converts the accelerator operation amount SL into visual information represented by the light emission of the segments, and conveys the accelerator operation amount SL to the driver by displaying the visual information.

Moreover, while the accelerator operation amount SL is less than the threshold operation amount Th1, the eco segments (the first segment 10a to the eighth segment 10h) emit light in white; and while the accelerator operation amount SL is greater than the threshold operation amount Th1, the non-eco segments (the ninth segment 10i to the 14th segment 10n) additionally emit light in blue. In other words, while the accelerator operation amount SL is less than the threshold operation amount Th1, the reaction force state display unit 1 displays the accelerator operation amount SL in the first area using the white light emission; and while the accelerator operation amount SL is greater than the threshold operation amount Th1, the reaction force state display unit 1 displays the accelerator operation amount SL in the second area using the blue light emission. Meanwhile, the driver can recognize whether or not the add-on reaction force Pa is added to the pedal reaction force Pp (whether or not the pedal reaction force Pp is amplified) depending on the difference in color between the white emitted light and the blue emitted light. In other words, the reaction force state display unit 1 includes the difference in color between the white emitted light and the blue emitted light in the visual information represented by the light emission of the segments, and uses the color difference as recognition information.

What is more, the reaction force state display unit 1 of the embodiment uses the white which is the color of the light emission from the eco segments in the first area as first recognition information, and uses the blue which is the color of the light emitted from the non-eco segments in the second area as second recognition information.

Besides, depending on the accelerator operation amount SL, the display controller 56 makes the eco state display area 11a in the efficiency display section 11 emit light in a third color (for example, green) which is different from the first color (white) and the second color (blue). In addition, the display controller 56 makes the eco state display area 11a emit light with higher luminance as a length of time for which only all of the eco segments in the operation amount display section 10 have emitted light in white becomes longer, that is to say, as a length of time for which all of the first segment 10a to the eighth segment 10h have emitted light in white and all of the ninth segment 10i to the 14th segment 10n have halted light emission becomes longer. For example, as shown in FIG. 3 (St1), in a case where only all of the eco segments in the operation amount display section 10 have emitted light in white and all of the non-eco segments therein have halted light emission, the meshed part (that is to say, the eco state display area 11a) of the efficiency display section 11 which is surrounded by the solid line emits light in green, and the other part thereof which is surrounded by the dashed line emit no light.

For example, as shown in FIG. 5A, at a moment when all of the non-eco segments (the ninth segment 10i to the 14th segment 10n) in the operation amount display section 10 halt light emission with all of the eco segments (the first segment 10a to the eighth segment 10h) therein continuing emitting light in white (that is to say, at an elapsed time Time0), the display controller 56 makes the eco state display area 11a emit no light.

Subsequently, once a predetermined delay time (of 0.5 seconds, for example) passes with all of the eco segments in the operation amount display section 10 continuing emitting light in white (that is to say, at an elapsed time Time1), the display controller 56 makes the eco state display area 11a emit light with lowest luminance, as shown in FIG. 5B.

Thereafter, each time a predetermined interval (of 5 seconds, for example) passes with all of the eco segments in the operation amount display section 10 continuing emitting light in white (that is to say, at each of elapsed times Time2 to Time4), the display controller 56 increases the luminance of the eco state display area 11a, as shown in FIGS. 5C to 5E. In addition, once the elapsed time Time4 passes with all of the eco segments continuing emitting light in white, the display controller 56 makes the eco state display area 11a emit light with highest luminance, as shown in FIG. 5E. After that, while all of the eco segments are kept emitting light in white, the display controller 56 keeps the eco state display area 11a emitting light with highest luminance.

As described above, the display controller 56 highlights the display in the efficiency display section 11 (see FIG. 1B) by increasing the luminance of the eco state display area 11a as the length of time for which the accelerator operation amount SL is kept at the threshold operation amount Th1 (that is to say, the length of time for which all of the eco segments are kept emitting light in white) becomes longer.

It should be noted that once the eighth segment 10h halts light emission or the ninth segment 10i starts light emission as a result of a change in the accelerator operation amount SL of the accelerator pedal 2 (see FIG. 1A), the display controller 56 makes the eco state display area 11a halt light emission. Furthermore, once the eighth segment 10h halts light emission or the ninth segment 10i starts light emission as a result of a change in the threshold operation amount Th1 accompanying a change in the vehicle speed V of the vehicle (albeit not illustrated), the display controller 56 also makes the eco state display area 11a halt light emission.

In addition, although FIGS. 5A to 5E show how the luminance with which the eco state display area 11a emits light changes by five steps, the number of steps in the change in the luminance of the light emitted from the eco state display area 11a is not limited to five. Furthermore, the configuration may be made such that the luminance of the eco state display area 11a changes in a continuum instead of stepwise.

Because of the configuration in which as described above, the luminance of the efficiency display section 11 (the eco state display area 11a) changes according to how long in time all of the eco segments (the first area) in the operation amount display section 10 emit light in white, the driver can visually recognize the length of time which elapses while keeping the accelerator position SL of the accelerator pedal 2 (see FIG. 1A) at or close to the threshold operation amount Th1.

Furthermore, the predetermined delay time (of 0.5 seconds, for example) is set between the time at which all of the eco segments in the operation amount display section 10 start to emit light in white and the time at which the eco state display area 11a starts to emit light. This inhibits the instantaneous light emission of the eco state display area 11a which would otherwise continuously come right after all of the eco segments in the operation amount display section 10 start to emit light in white.

As described above, the reaction force state display unit 1 (see FIG. 1A) includes the efficiency display section 11 for converting the efficiency of the power source into second visual information represented by the change in the luminance of the green light emission, and displaying the second visual information. In addition, the display controller 56 highlights the display of the second visual information in the efficiency display section 11 by increasing the luminance of the eco state display area 11a as the efficiency of the power source becomes higher.

It should be noted that in the case where the power source of the vehicle includes the gasoline engine and the drive motor, the threshold operation amount Th1 is set at the boundary between the first condition (MOT) in which only the drive motor is driven and the second condition (ENG) in which the gasoline engine is driven. For this reason, longer continuation of the white light emission of all of the eco segments (the first area) of the operation amount display section 10 means that the vehicle is more efficiently running using only the drive motor without consuming gasoline. Meanwhile, the longer continuation of the light emission of all of the eco segments means that the luminance of the eco state display area 11a becomes higher. The higher luminance of the eco state display area 11a means that the vehicle is efficiently running using only the drive motor for a longer length of time. In other words, even in the case where the power source of the vehicle includes the gasoline engine and the drive motor, the display controller 56 converts the efficiency of the power source into the second visual information represented by the change in the luminance of the green light emission of the eco state display area 11a, and displays the second visual information on the reaction force state display unit 1.

Furthermore, the display controller 56 may be configured to decrease the luminance of the eco state display area 11a as the number of eco segments emitting light in white decreases. For example, the display controller 56 may be configured to appropriately decrease the luminance of the eco state display area 11a each time two of the eco segments (the first segment 10a to the eighth segment 10h) halt light emission, as shown in FIGS. 6A to 6E.

This configuration is made as follows. While making all of the eco segments (the first segment 10a to the eighth segment 10h) emit light, the display controller 56 makes the eco state display area 11a emit light with highest luminance, as shown in FIG. 6A. While making 6 eco segments (the first segment 10a to the sixth segment 10f) emit light, the display controller 56 makes the eco state display area 11a emit light with lowered luminance, as shown in FIG. 6B. While making 4 eco segments (the first segment 10a to the fourth segment 10d) emit light, the display controller 56 makes the eco state display area 11a emit light with much lowered luminance, as shown in FIG. 6C. While making 2 eco segments (the first segment 10a and the second segment 10b) emit light, the display controller 56 makes the eco state display area 11a emit light with further lowered luminance, as shown in FIG. 6D. Eventually, while making no eco segment emit light, that is to say, while the accelerator operation amount SL is equal to "0," the display controller 56 makes the eco state display area 11a halt light emission, as shown in FIG. 6E.

Moreover, when making the ninth segment 10i (one of the non-eco segments) start to emit light in blue, the display controller 56 makes the eco state display area 11a halt light emission. Thus, the eco state display area 11a of the efficiency display section 11 enters a no-light emission state, as shown by surrounding the eco state display area 11a with the dashed line in FIG. 3 (St2).

In the case of the above-described configuration, the display controller 56 changes the light emission of the efficiency display section 11 (the eco state display area 11a) according to the display in the eco segments (the first area) of the operation amount display section 10. In the operation amount display section 10, the number of eco segments to emit light changes according to the difference between the accelerator operation amount SL and the threshold operation amount Th1. In addition, the threshold operation amount Th1 is the threshold value (operation threshold value) which is determined based on the efficiency of the power source, albeit not illustrated. Thus, the display in the eco segments changes according to the efficiency of the power source, and the light emission (luminance) of the efficiency display section 11 designed to change according to the display in the eco segments changes according to the efficiency of the power source.

Moreover, the display controller 56 may be configured to make the luminance of the efficiency display section 11 (the eco state display area 11a) become larger as the accelerator operation amount SL gets back to the threshold operation amount Th1 from a level corresponding to the light emission of the non-eco segments (the ninth segment 10i to the 14th segment 10n) in the operation amount display section 10 (that is to say, the accelerator operation amount SL gets closer to the threshold operation amount Th1 from the range above the threshold operation amount Th1).

Even in a case where, for example, the driver depresses the accelerator pedal 2 (see FIG. 1A) beyond the threshold operation amount Th1, the above-described configuration makes it possible for the driver to securely reduce the accelerator operation amount SL to the threshold operation amount Th1 by returning the accelerator pedal 2 based on the display in the eco state display area 11a.

The display controller 56 may be configured, for example, to make the eco state display area 11a in the efficiency display section 11 emit light with higher luminance as an elapsed time becomes longer after all of the eco segments (the first area) start to emit light following the halt of the light emission of the non-eco segments (the second area).

Otherwise, the display controller 56 may be configured to increase the luminance of the light emitted from the eco state display area 11a as the number of non-eco segments (in the second area) to emit light becomes smaller, and to make the eco state display area 11a emit light with highest luminance when making the non-eco segments halt the light emission and all of the eco segments start to emit light.

Furthermore, the display controller 56 makes the eco state display area 11a emit light in green while making all of the eco segments emit light in white and the non-eco segments emit no light, and decreases the luminance of the eco state display area 11a as the number of eco segments emitting light in white becomes smaller. As the number of eco segments emitting light in white becomes larger, the accelerator operation amount SL becomes closer to the threshold operation amount Th1 and the efficiency of the power source (albeit not illustrated) becomes higher. For this reason, the display controller 56 highlights the display of the efficiency of the power source by increasing the luminance of the eco state display area 11a as the efficiency of the power source becomes higher.

As described above, the reaction force state display unit 1 includes the efficiency display section 11 for converting the efficiency of the power source into the second visual information represented by the change in the luminance of the green light emission, and displaying the second visual information. In addition, the display controller 56 highlights the display of the second visual information in the efficiency display section 11 by increasing the luminance of the eco state display area 11a as the efficiency of the power source becomes higher.

When the ECU 5 executes the eco-drive assistance, the display controller 56 controls the reaction force state display unit 1, as described above.

The eco segments (the first area) and the non-eco segments (the second area) are set in the operation amount display section 10. The eco segments are configured to show that the accelerator operation amount SL is less than the threshold operation amount Th1. The non-eco segments are configured to show that the accelerator operation amount SL exceeds the threshold operation amount Th1. The eco segments emit light in white (the first color), and the non-eco segments emit light in blue (the second color).

While the accelerator operation amount SL is in the range in which the accelerator operation amount SL causes eco add-on reaction force Peco (that is to say, while the accelerator operation amount SL is greater than the threshold operation amount Th1), the non-eco segments are emitting light in blue. With the assistance of the blue light emission of the operation amount display section 10, the driver can visually recognize that the eco add-on reaction force Peco is produced and added to the pedal reaction force Pp (that is to say, the pedal reaction force Pp of the accelerator pedal 2 is amplified). While the accelerator operation amount SL is greater than the threshold operation amount Th1, the driver can recognize the decrease in the efficiency of the power source with the assistance of the visual information represented by the light emission of the non-eco segments, in addition to the stimulus representing the increase in the pedal reaction force Pp.

In addition, the eco state display area 11a is set in the efficiency display section 11, and emits light in the third color (green) which is different from the first color (white) and the second color (blue). Furthermore, the luminance of the eco state display area 11a changes according to the accelerator operation amount SL. Moreover, when the ninth segment 10i (one of the non-eco segments) stars to emit light, the eco state display area 11a halts light emission. While the non-eco segments are emitting light, the accelerator operation amount SL is greater than the threshold operation amount Th1, and the efficiency of the power source (albeit not illustrated) of the vehicle is lower. In that case, the driver can visually recognize the decrease in the efficiency of the power source by visually checking the eco state display area 11a. Besides, the eco state display area 11a emits light with higher luminance as all of the eco segments (the first segment 10a to the eighth segment 10h) emit light for a longer time. All of the eco segments are emitting light in white while the accelerator operation amount SL is equal to the threshold operation amount Th1. Thus, the driver can visually recognize the length of time for which the efficiency of the power source remains highest depending on the luminance of the eco state display area 11a.

What is more, the non-eco state display area 12a is set in the range display section 12, and emits light in blue. The non-eco state display area 12a is the area corresponding to the location of the non-eco segments in the operation amount display section 10. The non-eco segments display the indication that the accelerator operation amount SL is in the range where the accelerator operation amount SL causes the eco add-on reaction force Peco to be produced. For this reason, with the assistance of the blue light emission of the range display section 12 (the non-eco area 12a), the driver can visually recognize the range where the accelerator operation amount SL causes the eco add-on reaction force Peco to be produced, and for example, can depress the accelerator pedal 2 in a range which does not make the reaction force generator 4 produce the eco add-on reaction force Peco. Thereby, the driver can run the vehicle (albeit not illustrated) with the highest efficiency of the power source.

It should be noted that the gasoline engine installed as the power source in the vehicle (albeit not illustrated) may have a function of generating electric power to be supplied to the drive motor in addition to being configured to generate power for driving the drive wheels (albeit not illustrated). In that case, the configuration is made such that: once the amount of electric power stored in a power storage device (albeit not illustrated) for storing the electric power to be supplied to the drive motor becomes lower than a predetermined value, the gasoline engine starts to drive to generate power; and the thus-generated electric power is stored in the power storage device. In addition, the drive motor is configured to drive using the electric power stored in the power storage device.

In the case where as described above, the gasoline engine has the function of generating the electric power to be supplied to the drive motor, a first condition is defined as a condition in which only the drive motor drives (that is to say, the drive motor drives using the electric power stored in the power storage device, albeit not illustrated) to drive the drive wheels. Meanwhile, a second condition is defined as a condition in which the gasoline engine drives to generate the electric power to be supplied to the drive motor and the drive motor drives using the electric power to drive the drive wheels.

Otherwise, the vehicle (albeit not illustrated) may include a gasoline engine which has both the function of generating the electric power to be supplied to the drive motor and the function of generating power for driving the drive wheels. In that case, the first condition is defined as a condition in which only the drive motor drives. Meanwhile, the second condition is defined as a condition in which the gasoline engine drives to generate the electric power to be supplied to the drive motor and the drive motor drives using the electric power to drive the drive wheels, or as a condition in which the gasoline engine drives to generate power and the thus-generated power drives the drive wheel.

In addition, in a case where the vehicle (albeit not illustrated) includes no gasoline engine and is an electric vehicle (albeit not illustrated) whose power source is an electric motor, it is desirable that the first condition be set as a condition in which electric power consumption is lower than in the second condition. In addition, it is desirable that the configuration be made such that the first condition with lower electric power consumption is switched over to the second condition with the higher electric power consumption when the accelerator operation amount SL of the accelerator pedal 2 (see FIG. 1A) exceeds the threshold operation amount Th1.

It should be noted that although the ECU 5 has been explained as being configured such that the accelerator operation amount SL which makes the fuel economy become the best and drives the power source at the highest efficiency is set as the threshold operation amount Th1, the ECU 5 may be configured such that what is different by a predetermined amount from the accelerator operation amount SL which drives the power source at the highest efficiency is set as the threshold operation amount Th1.

For example, in a case where the threshold operation amount Th1 is set less than the accelerator operation amount SL which makes the fuel economy become the best and drives the power source at the highest efficiency, the configuration may be made such that all of the eco segments in the operation amount display section 10 start to emit light before the power source actually starts to drive at the highest efficiency. Thereby, the driver can recognize that the power source is very close to starting to drive at the highest efficiency.

Meanwhile, in a case where the threshold operation amount Th1 is set greater than the accelerator operation amount SL which makes the fuel economy become the best and drives the power source at the highest efficiency, the configuration may be made such that all of the eco segments in the operation amount display section 10 start to emit light after the vehicle (albeit not illustrated) sufficiently accelerates with the power source driving at the highest efficiency. This configuration makes it possible for the driver to maintain the accelerator operation amount SL after the vehicle has sufficiently accelerated, and thus to preferably accelerate the vehicle without lowering the efficiency of the power source to a large extent.

<<Slip Prevention Assistance>>

Figure 7:
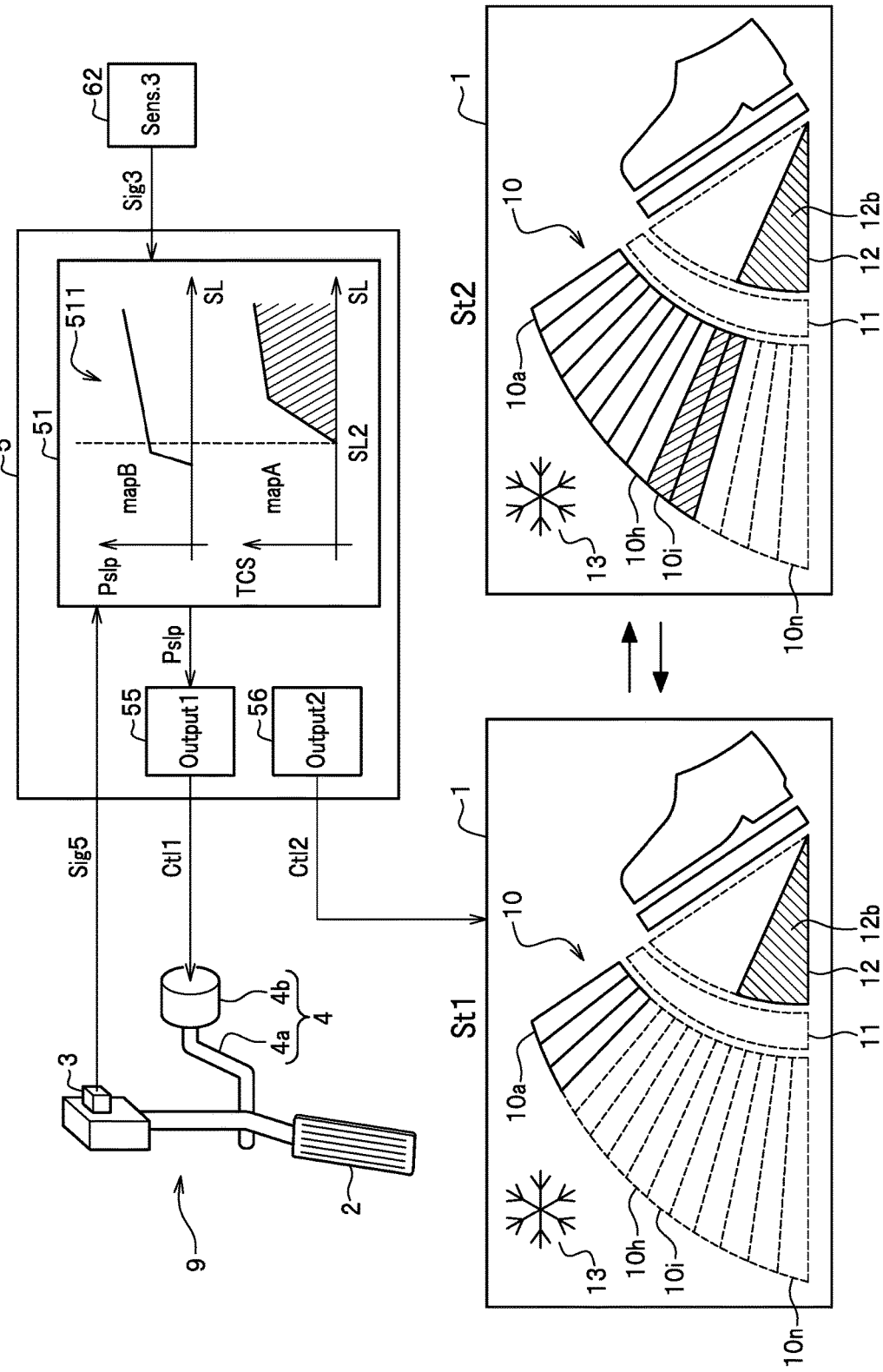
FIG. 7 is a diagram showing what state the reaction force state display unit is in when the ECU executes the slip prevention assistance.

FIG. 7 shows a diagram showing how the reaction force state display unit works when the ECU executes the slip prevention assistance. Incidentally, a state St1 of the reaction force state display unit 1 shown in FIG. 7 represents a state where the accelerator operation amount SL is less than a slip limit operation amount SL2, and a state St2 thereof represents a state where the accelerator operation amount SL is greater than the slip limit operation amount SL2.

To execute the slip prevention assistance, the slip prevention reaction force calculator 51 of the ECU 5 judges whether or not the drive wheels (albeit not illustrated) of the vehicle lose traction while the vehicle is starting or while the vehicle is running, based on the wheel speed signal Sig3 received from the wheel speed sensor 62. Thereafter, based on a slip reaction force setting map 511 shown in FIG. 7, the slip prevention reaction force calculator 51 calculates slip reaction force Pslp to be added to the pedal reaction force Pp (that is to say, the add-on reaction force Pa to be added for the slip prevention assistance).

The slip reaction force setting map 511 includes two maps (mapA, mapB). Reference sign mapA in the slip reaction force setting map 511 denotes a map showing a relationship between the execution of the assistance by a traction control system (TCS) configured to reduce the slip of the vehicle (albeit not illustrated) and the accelerator operation amount SL. Meanwhile, reference sign mapB therein denotes a map showing a relationship between the accelerator operation amount SL and the slip reaction force Pslp.

For example, based on the wheel speed signal Sig3, the slip prevention reaction force calculator 51 calculates the wheel speed of the drive wheels to which the power is transmitted, albeit not illustrated, from the power source, and the wheel speed of the driven wheels to which no power is transmitted therefrom. When the wheel speed of the drive wheels is greater than the wheel speed of the driven wheels by a predetermined value, the slip prevention reaction force calculator 51 judges that the drive wheels lose traction. In this manner, the slip prevention reaction force calculator 51 works as a slip state detector configured to judge whether or not the drive wheels lose traction. Incidentally, the predetermined value used when the slip prevention reaction force calculator 51 judges whether or not the drive wheels lose traction may be a value determined appropriately.

If judging that the drive wheels (albeit not illustrated) lose traction, the slip prevention reaction force calculator 51 calculates the accelerator operation amount SL (the slip limit operation amount SL2) which can produce torque which is the largest without traction loss for the drive wheels. For example, the slip prevention reaction force calculator 51 defines the slip limit operation amount SL2 as the accelerator operation amount SL which the slip prevention reaction force calculator 51 judges allows the drive wheels to lose traction (to put it in detail, the amount of accelerator depression which is slightly less than the accelerator operation amount SL). The thus-calculated slip limit operation amount SL2 is a threshold value (operation threshold value) of the accelerator operation amount SL at which the vehicle (albeit not illustrated) starts to be capable of running without losing traction.

Thereby, if the accelerator operation amount SL is greater than the slip limit operation amount SL2, the ECU 5 executes the assistance for reducing the slip of the vehicle using the traction control system (TCS).

If the accelerator operation amount SL is greater than the slip limit operation amount SL2, the slip prevention reaction force calculator 51 amplifies the pedal reaction force Pp by adding the slip reaction force Pslp to the pedal reaction force Pp. Based on the thus-amplified pedal reaction force Pp, the driver can recognize that: the vehicle is highly likely to slip; and the assistance using the traction control system (TCS) is being executed.

In the map mapA of the slip reaction force setting map 511 shown in FIG. 7, the hatched area shows how the assistance using the traction control system (TCS) is executed. As shown in the map mapA of the slip reaction force setting map 511, the slip limit operation amount SL2 is the accelerator operation amount SL at which the ECU 5 starts to execute the assistance using the traction control system (TCS).

Furthermore, the slip prevention reaction force calculator 51 monitors the accelerator operation amount SL by monitoring the operation amount signal Sig5 received from the stroke sensor 3. Thus, if judging that the accelerator operation amount SL reaches the slip limit operation amount SL2 (the operation threshold value), the slip prevention reaction force calculator 51 calculates the add-on reaction force Pa (the slip reaction force Pslp) for the slip prevention assistance based on the map mapB of the slip reaction force setting map 511.

Moreover, the target reaction force output unit 55 of the ECU 5 outputs the motor drive signal Ctl1 in order for the reaction force motor 4b to produce the torque for adding the slip reaction force Pslp calculated by the slip prevention reaction force calculator 51 to the pedal reaction force Pp.

Moreover, of the 14 segments (the first segment 10a to the 14th segment 10n) included in the operation amount display section 10, the first segment 10a to the eighth segment 10h are designated as "non-slip segments" by the display controller 56, and the ninth segment 10i to the 14th segment 10n are designated as "slip segments" by the display controller 56. Thereby, the operation amount display section 10 is divided into an area (first area) where the non-slip segments are arranged and an area (second area) where the slip segments are arranged.

It should be noted that although in the embodiment, the first segment 10a to the eighth segment 10h are designated as the non-slip segments, no restriction is imposed on the number of non-slip segments or the number of slip segments.

The first segment 10a to the eighth segment 10h designated as the non-slip segments are segments used to display the accelerator operation amount SL in a range below the slip limit operation amount SL2. Each segment corresponds to one of eight parts into which the range below the slip limit operation amount SL2 is divided.

While the accelerator operation amount SL is less than the slip limit operation amount SL2, no add-on reaction force Pa (the slip reaction force Pslp) is produced. For this reason, the non-slip segments serve as the segments used to display the accelerator operation amount SL which does not cause the slip reaction force Pslp to be produced.

Furthermore, the ninth segment 10i to the 14th segment 10n designated as the slip segments are segments used to display the accelerator operation amount SL which is in a range above the slip limit operation amount SL2. Each segment corresponds to one of six parts into which the range above the slip limit operation amount SL2 is divided.

While the accelerator operation amount SL is greater than the slip limit operation amount SL2, the slip reaction force Pslp is produced. For this reason, the slip segments serve as the segments used to display the accelerator operation amount SL which causes the slip reaction force Pslp to be produced.

Moreover, when the ECU 5 starts to execute the slip prevention assistance, the display controller 56 makes the TCS icon 13 emit light. The TCS icon 13 is an icon used for the ECU 5 to make the driver recognize that the ECU 5 amplifies the pedal reaction force Pp of the accelerator pedal 2 for the slip prevention assistance, and emits light "in the form of a snowflake," for example.

In addition, the display controller 56 designates a sector-shaped area in the range display section 12, which is adjacent to the slip segments in the operation amount display section 10, as a slip area 12b, and makes the slip area 12b emit light in blue (the second color). In FIG. 7 (St1, St2), in the range display section 12, a hatched part surrounded by a solid line is designated as the slip area 12b, and emits light in blue; and the other part surrounded by a dashed line emits no light.

Incidentally, the display controller 56 makes the efficiency display section 11 halt light emission. Accordingly, the efficiency display section 11 emits no light, as shown in FIG. 7.

Besides, the display controller 56 makes the segments (the first segment 10a to the 14th segment 10n) in the operation amount display section 10 emit light according to the accelerator operation amount SL. In that case, the display controller 56 makes the non-slip segments (the first segment 10a to the eighth segment 10h) emit light in white, and the slip segments (the ninth segment 10i to the 14th segment 10n) emit light in blue. In this manner, the display controller 56 displays visual information (segment light emission) including the first recognition information (in white) in the first area (the non-slip segments), and the other visual information (segment light emission) including the second recognition information (in blue) in the second area (the slip segments). In FIG. 7 (St1), in the operation amount display section 10, segments each surrounded by a solid line and shown in white emit light in white, and the other segments each surrounded by a dashed line emit no light. On the other hand, in FIG. 7 (St2), in the operation amount display section 10, segments each surrounded by a solid line and shown in white emit light in white; other segments each surrounded by a solid line and hatched emit light in blue; and the other segments each surrounded by a dashed line emit no light.

When the ECU 5 starts to execute the slip prevention assistance, the display controller 56 controls the reaction force state display unit 1, as described above.

The non-slip segments and the slip segments are set in the operation amount display section 10. The non-slip segments are configured to show that the accelerator operation amount SL is less than the slip limit operation amount SL2. The slip segments are configured to show that the accelerator operation amount SL exceeds the slip limit operation amount SL2. According to the accelerator operation amount SL, the non-slip segments emit light in white (the first color), and the slip segments emit light in blue (the second color).

Meanwhile, when the ECU 5 starts to execute the slip prevention assistance, the display controller 56 makes the efficiency display section 11 halt light emission. Accordingly, the efficiency display section 11 emits no light, as shown in FIG. 7.

Besides, while the accelerator operation amount SL is in the range in which the accelerator operation amount SL causes slip reaction force Pslp to be produced (that is to say, while the accelerator operation amount SL is greater than the slip limit operation amount SL2), the slip segments are emitting light in blue. With the assistance of the blue light emission of the operation amount display section 10, the driver can visually recognize that the slip reaction force Pslp is produced and added to the pedal reaction force Pp (that is to say, the pedal reaction force Pp of the accelerator pedal 2 is amplified). While the accelerator operation amount SL is greater than the slip limit operation amount SL2, the assistance using the traction control system (TCS) is executed. For this reason, the driver can recognize the execution of the assistance using the traction control system (TCS) with the assistance of the visual information represented by the light emission of the slip segments, in addition to the stimulus representing the increase in the pedal reaction force Pp.

In addition, the slip area 12b is set in the range display section 12, and emits light in blue. The slip area 12b is the area corresponding to the location of the slip segments in the operation amount display section 10. The slip area 12b always displays the accelerator operation amount SL greater than the slip limit operation amount SL2 irrespective of how large the amount of depression of the accelerator pedal 2 is. For these reason, with the assistance of the blue light emission of the range display section 12, the driver can visually recognize the accelerator operation amount SL which makes the assistance using traction control system (TCS) executed.

Furthermore, the light emission of the TCS icon 13 in the reaction force state display unit 1 makes it possible for the driver to visually recognize the increase in the pedal reaction force Pp of the accelerator pedal 2 for the slip prevention.

<<Sport-Drive Assistance>>

Figure 8:
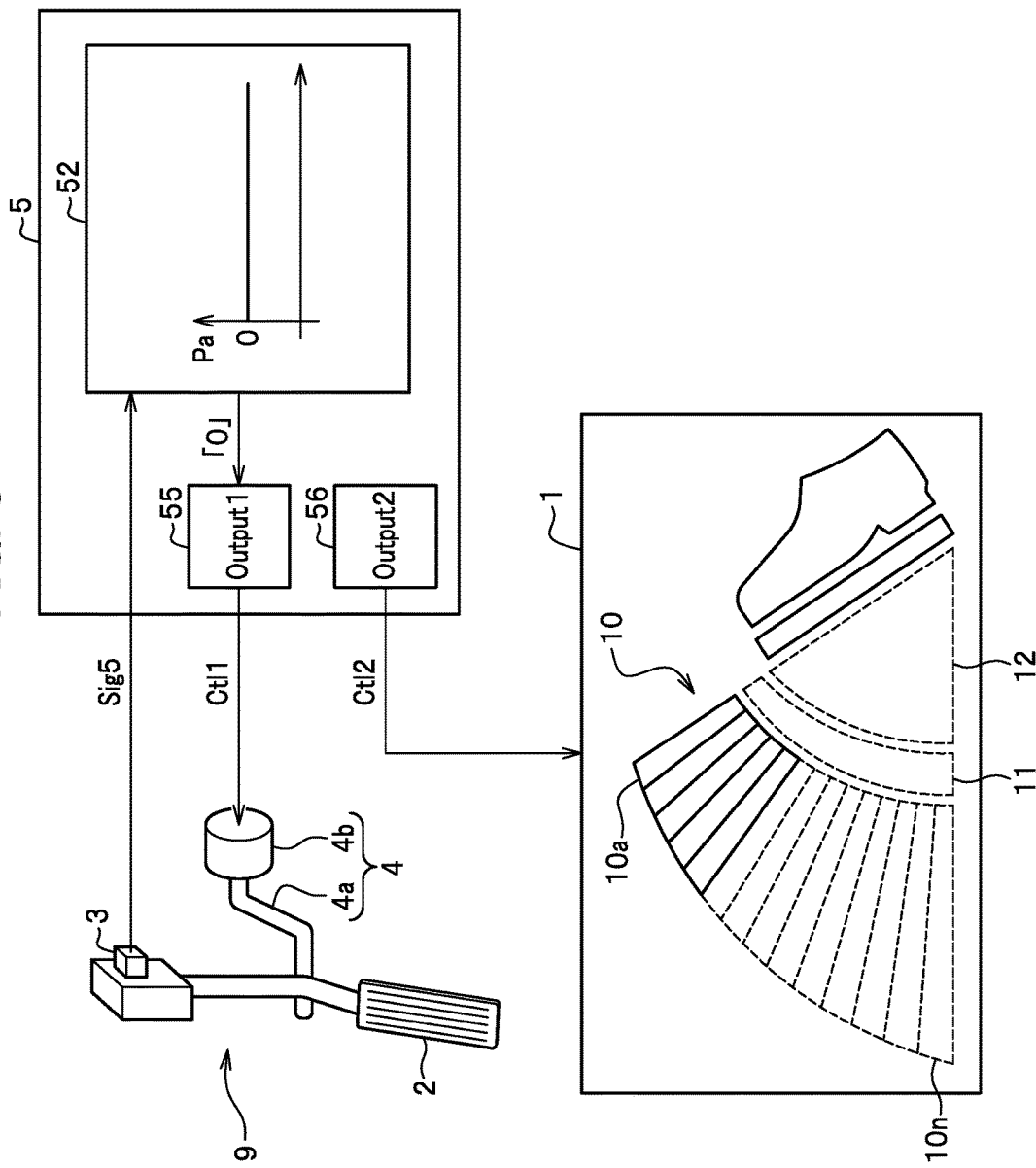
FIG. 8 is a diagram showing what state the reaction force state display unit is in when the ECU executes the sport-drive assistance.

FIG. 8 shows a diagram showing how the reaction force state display unit works when the ECU executes the sport-drive assistance.

When the ECU 5 starts to execute the sport-drive assistance, the sport-mode reaction force calculator 52 sets the add-on reaction force Pa at "0." In other words, while the ECU 5 is executing the sport-drive assistance, no add-on reaction force Pa is being added to the pedal reaction force Pp of the accelerator pedal 2. Accordingly, the reaction force generator 4 enters the reaction-force addition stopping state in which the reaction force generator 4 adds no add-on reaction force Pa to the pedal reaction force Pp.

Since as described above, no add-on reaction force Pa is being added to the pedal reaction force Pp while the ECU 5 is executing the sport-drive assistance, the driver can depress the accelerator pedal 2 quickly.

In addition, the display controller 56 makes the segments (the first segment 10*a* to the 14th segment 10*n*) in the operation amount display section 10 emit light in white according to the accelerator operation amount SL. In other words, the display controller 56 designates all of the operation amount display section 10 as a first area for displaying visual information (light emission) which includes first recognition information (in white). In FIG. 8, in the operation amount display section 10, segments each surrounded by a solid line emit light in white, and the other segments each surrounded by a dashed line emit no light.

Furthermore, when the ECU 5 executes the sport-drive assistance, the display controller 56 controls the operation amount display section 10 in a way that each of the 14 segments (the first segment 10*a* to the 14th segment 10*n*) included in the operation amount display section 10 corresponds to one fourteenth of all the amount of operation of the accelerator pedal 2. That is to say, the configuration is made such that each time the accelerator operation amount SL changes by one fourteenth of all the amount of operation, a corresponding segment starts to emit light (or halts light emission).

Incidentally, when the ECU 5 executes the sport-drive assistance, the display controller 56 makes the efficiency display section 11 halt light emission. Thus, the efficiency display section 11 emits no light, as indicated with the dashed line in FIG. 8.

Moreover, when the ECU 5 executes the sport-drive assistance, the display controller 56 makes the efficiency display section 11 and the range display section 12 halt light emission. Thereby, the efficiency display section 11 and the range display section 12 emit no light, as indicated with dashed lines.

When the ECU 5 executes the sport-drive assistance, the display controller 56 controls the reaction force state display unit 1, as described above.

The segments (the first segment 10*a* to the 14th segment 10*n*) in the operation amount display section 10 emit light in white according to the accelerator operation amount SL. For this reason, the driver can visually recognize the accelerator operation amount SL.

Furthermore, the driver can visually recognize that no add-on reaction force Pa is being added to the pedal reaction force Pp by visually checking the range display section 12 which halts light emission.

<<Cornering Assistance>>

Figure 9:
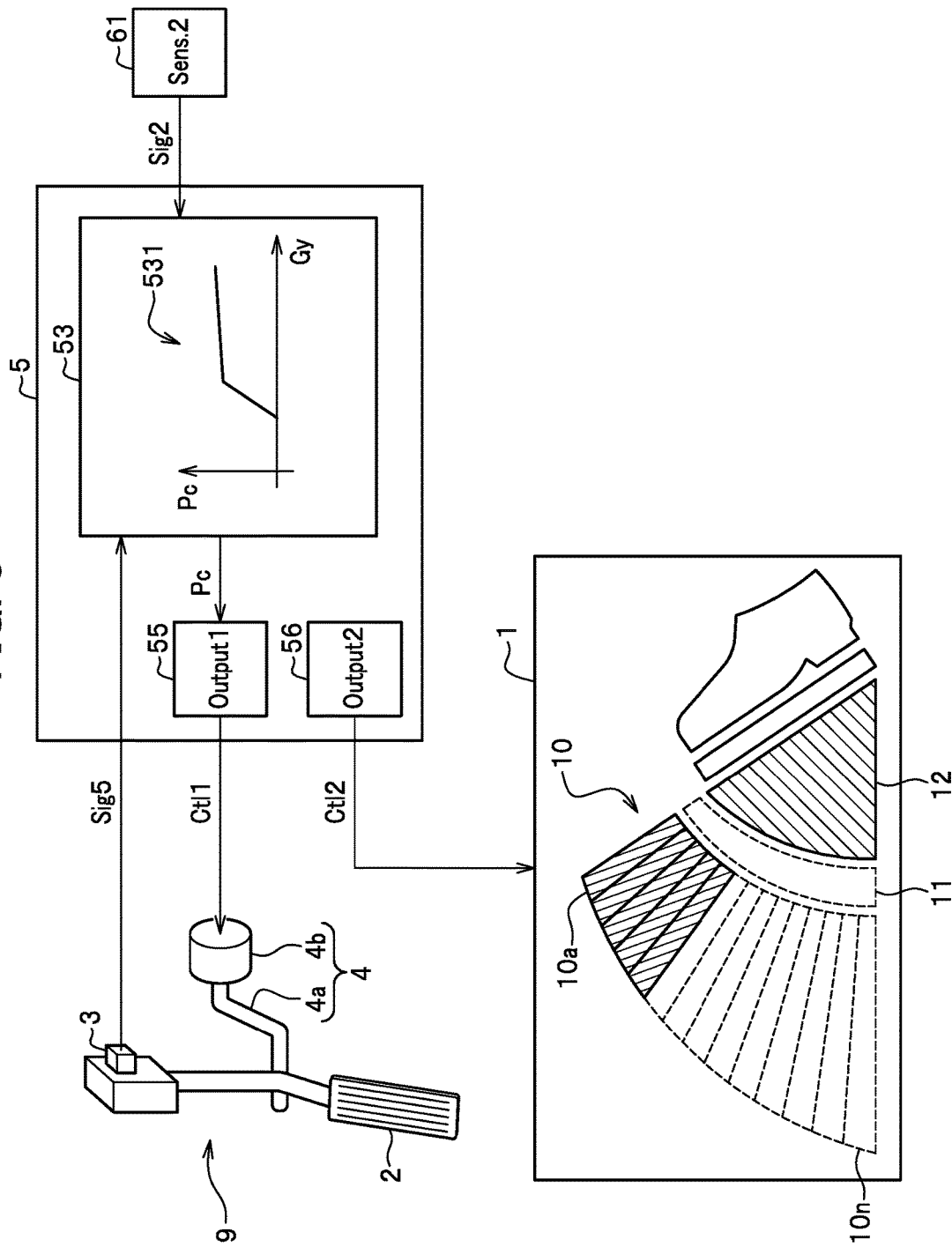
FIG. 9 is a diagram showing what state the reaction force state display unit is in for the cornering assistance.

FIG. 9 shows a diagram showing how the reaction force state display unit works when the ECU executes the cornering assistance.

When the ECU 5 executes the cornering assistance, the lateral g-force assistance reaction force calculator 53 calculates acceleration in the lateral direction (that is to say, lateral acceleration Gy) acting on the vehicle, based on the acceleration signal Sig2 received from the acceleration sensor 61.

Furthermore, according to the calculated lateral acceleration Gy, the lateral g-force assistance reaction force calculator 53 calculates the add-on reaction force Pa (cornering reaction force Pc) corresponding to the lateral acceleration Gy by referring to a cornering reaction force setting map 531 shown in FIG. 9. The cornering reaction force setting map 531 is a map in which cornering reaction forces Pc are set corresponding to lateral accelerations Gy. It is desirable that the cornering reaction force setting map 531 be beforehand set according to the driving performance required for the vehicle.

While the lateral acceleration Gy is working on the vehicle, there is high possibility that the vehicle is cornering such as running along a curve. In that case, if excessive driving torque occurs, there is likelihood that understeer occurs and the driving condition thus becomes unstable. For this reason, while the lateral acceleration Gy is acting on the vehicle, the ECU 5 warns the driver not to cause excessive driving torque by: adding the cornering reaction force Pc calculated by the lateral g-force assistance reaction force calculator 53 to the pedal reaction force Pp; and thereby amplifying the pedal reaction force Pp. By executing the cornering assistance in this manner, the ECU 5 assists the driver in driving the vehicle in a way that inhibits the occurrence of the understeer.

The target reaction force output unit 55 of the ECU 5 outputs the motor drive signal Ctl1 in order for the reaction force motor 4*b* to produce torque for adding the cornering reaction force Pc calculated by the lateral g-force assistance reaction force calculator 53 to the pedal reaction force Pp.

Moreover, the display controller 56 makes all the range display section 12 emit light in blue (the second color). Thereby, the range display section 12 emits light in blue, as indicated with hatching in FIG. 9.

In addition, the display controller 56 makes the segments (the first segment 10*a* to the 14th segment 10*n*) in the operation amount display section 10 emit light in blue according to the accelerator operation amount SL. In other words, the display controller 56 designates all the range display section 12 as the second area for displaying the visual information (light emission) which includes the second recognition information (in blue). In FIG. 9, in the operation amount display section 10, hatched segments each surrounded by a solid line emits light in blue, and the other segments each surrounded by a dashed line emits no light.

Furthermore, when the ECU 5 executes the cornering assistance, the display controller 56 controls the operation amount display section 10 in a way that each of the 14 segments (the first segment 10*a* to the 14th segment 10*n*) included in the operation amount display section 10 corresponds to one fourteenth of all the amount of operation of the accelerator pedal 2. That is to say, the configuration is made such that each time the accelerator operation amount SL changes by one fourteenth of all the amount of operation, a corresponding segment starts to emit light (or halts light emission).

Incidentally, when the ECU 5 executes the cornering assistance, the display controller 56 makes the efficiency display section 11 halt light emission. Thus, the efficiency display section 11 emits no light, as indicated with a dashed line.

When the ECU 5 executes the cornering assistance, the display controller 56 controls the reaction force state display unit 1, as described above.

The segments (the first segment 10*a* to the 14th segment 10*n*) in the operation amount display section 10 emit light in blue according to the accelerator operation amount SL. For this reason, the driver can visually recognize the accelerator operation amount SL. Furthermore, the driver can visually recognize that the pedal reaction force Pp is amplified by adding the cornering reaction force Pc to the pedal reaction force Pp.

Moreover, all the range display section 12 emits light in blue. For this reason, the driver can visually recognize that the pedal reaction force Pp is amplified by adding the cornering reaction force Pc to the pedal reaction force Pp across the full range of the accelerator operation amount SL (the full range of the depression of the accelerator pedal 2).

<<Collision Avoidance Assistance>>

Figure 10:
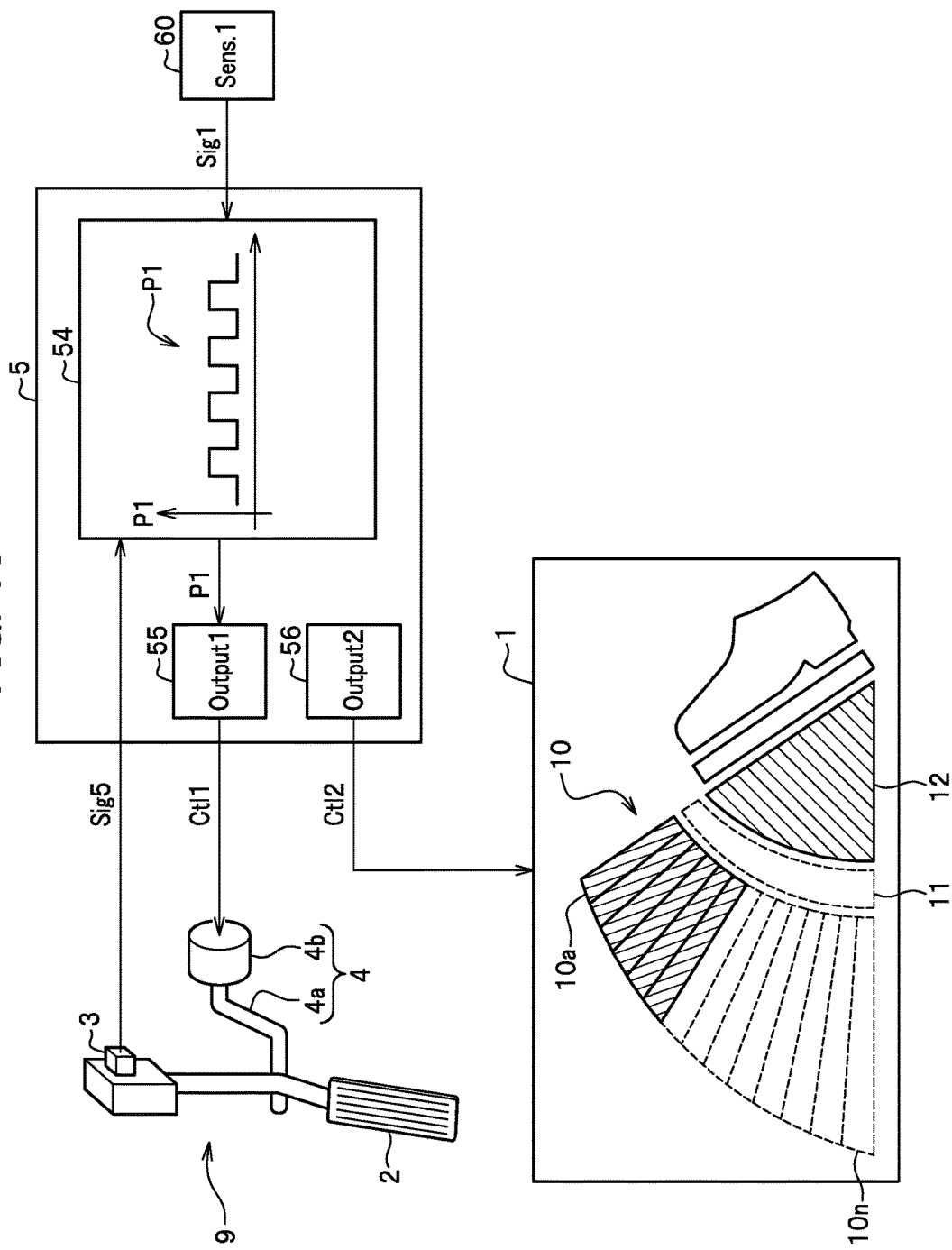
FIG. 10 is a diagram showing what state the reaction force state display unit is in for the collision avoidance assistance.

FIG. 10 is a diagram showing how the reaction force state display unit works for the collision avoidance assistance.

When the ECU 5 executes the collision avoidance assistance, the collision avoidance reaction force calculator 54 calculates the distance between the driver's vehicle and an obstacle (such as a building, or a preceding vehicle) ahead of the vehicle, based on the distance signal Sig1 received from the radar system 60. Subsequently, if the calculated distance is not greater than a predetermined value, the collision avoidance reaction force calculator 54 calculates a predetermined collision avoidance reaction force P1 (the add-on reaction force Pa for the collision avoidance assistance). The collision avoidance reaction force P1 may be a reaction force with a predetermined strength.

If the distance between the driver's vehicle and the obstacle ahead is not greater than the predetermined value, the ECU 5 amplifies the pedal reaction force Pp by adding the collision avoidance reaction force P1 calculated by the collision avoidance reaction force calculator 54 to the pedal reaction force Pp, and warns the driver using the thus-amplified pedal reaction force Pp. In other words, the ECU 5 uses the distance between the driver's vehicle and the obstacle ahead as the vehicle information, and adds the collision avoidance reaction force P1 to the pedal reaction force Pp based on this vehicle information.

Furthermore, if the collision avoidance reaction force calculator 54 calculates the collision avoidance reaction force P1 at regular intervals, a stimulus is periodically given to the foot of the driver with which the driver depresses the accelerator pedal 2 because the pedal reaction force Pp of the accelerator pedal 2 changes periodically. Such periodic stimuli given to the foot increase the amount of stimulation to be received by the driver, and make it possible for the driver to feel the stimuli with high sensitivity. For this reason, the warning effect can be enhanced.

It should be noted that the ECU 5 may be configured to execute the collision avoidance assistance in a way that the ECU 5 amplifies the pedal reaction force Pp by adding the collision avoidance reaction force P1 to the pedal reaction force Pp if a time-to-collision (TTC) calculated based on the distance between the driver's vehicle and the obstacle ahead (for example, a preceding vehicle) as well as the relative speed of the driver's vehicle against the obstacle ahead becomes equal to or less than the predetermined value. In that case, the time-to-collision (TTC) is vehicle information used to add the collision avoidance reaction force P1 to the pedal reaction force Pp.

The target reaction force output unit 55 of the ECU 5 outputs the motor drive signal Ctl1 in order for the reaction force motor 4b to produce torque for adding the collision avoidance reaction force P1 calculated by the collision avoidance reaction force calculator 54 to the pedal reaction force Pp.

Moreover, the display controller 56 makes all the range display section 12 emit light in blue (the second color). Thereby, the range display section 12 emits light in blue, as indicated with hatching in FIG. 10.

In addition, when the ECU 5 executes the collision avoidance assistance, the display controller 56 makes the segments (the first segment 10a to the 14th segment 10n) in the operation amount display section 10 emit light in blue according to the accelerator operation amount SL. In other words, the display controller 56 designates all the range display section 12 as the second area for displaying the visual information (light emission) which includes the second recognition information (in blue). In FIG. 10, in the operation amount display section 10, hatched segments each surrounded by a solid line emits light in blue, and the other segments each surrounded by a dashed line emits no light.

Furthermore, when the ECU 5 executes the collision avoidance assistance, the display controller 56 controls the operation amount display section 10 in a way that each of the 14 segments (the first segment 10a to the 14th segment 10n) included in the operation amount display section 10 corresponds to one fourteenth of all the amount of operation of the accelerator pedal 2. That is to say, the configuration is made such that each time the accelerator operation amount SL changes by one fourteenth of all the amount of operation, a corresponding segment starts to emit light (or halts light emission).

Incidentally, when the ECU 5 executes the collision avoidance assistance, the display controller 56 makes the efficiency display section 11 halt light emission. Thus, the efficiency display section 11 emits no light, as indicated with a dashed line.

When the ECU 5 executes the collision avoidance assistance, the display controller 56 controls the reaction force state display unit 1, as described above.

The segments (the first segment 10a to the 14th segment 10n) in the operation amount display section 10 emit light in blue according to the accelerator operation amount SL. For this reason, the driver can visually recognize the accelerator operation amount SL. Furthermore, the driver can visually recognize that the collision avoidance reaction force P1 is being added to the pedal reaction force Pp.

Moreover, all the range display section 12 emits light in blue. For this reason, the driver can visually recognize that the pedal reaction force Pp is amplified by adding the collision avoidance reaction force P1 to the pedal reaction force Pp across the full range of the accelerator operation amount SL (the full range of the depression of the accelerator pedal 2).

It should be noted that if the collision avoidance reaction force calculator 54 calculates the collision avoidance reaction force P1 at regular intervals, the pedal reaction force Pp of the accelerator pedal 2 increases and decreases in a periodically repeated manner. With this taken into consideration, the display controller 56 may be configured, for example, such that: while the collision avoidance reaction force P1 is being produced, the display controller 56 makes the segments in the operation amount display section 10 and the range display section 12 emit light in blue; and while no collision avoidance reaction force P1 is being produced, the display controller 56 makes the segments in the operation amount display section 10 and the range display section 12 emit light in white (or in another color).

This configuration makes the color of the light emission of the segments in the operation amount display section 10 and the range display section 12 changes in synchronism with the periodic change in the pedal reaction force Pp. Thereby, the driver can visually recognize the periodic change in the pedal reaction force Pp. Furthermore, the periodic change in the color of the light emission of the segments in the operation amount display section 10 and the range display section 12 increases the amount of visual stimulation to be received by the driver, and makes it possible for the driver to securely recognize the possibility of a collision. In other words, this configuration effectively warns the driver of a possible collision, and enhances the effect of the collision avoidance assistance.

<<Add-on Reaction Force OFF Control>>

Figure 11:
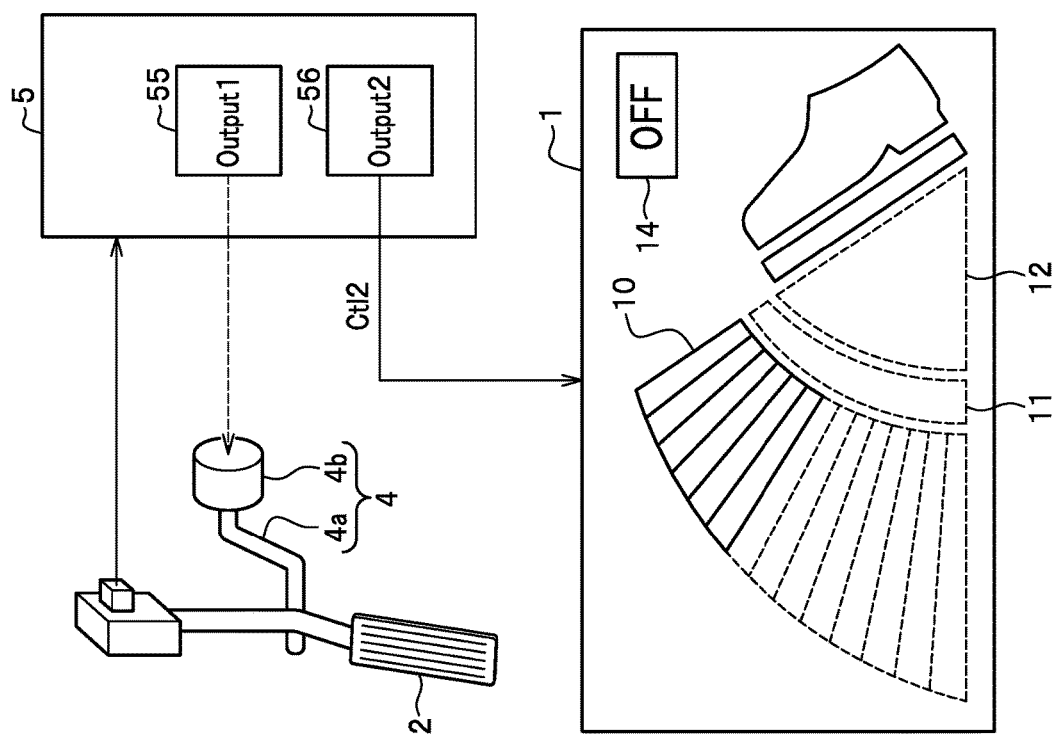
FIG. 11 is a diagram showing what state the reaction force state display unit is in for the add-on reaction force OFF control.

FIG. 11 is a diagram showing how the reaction force state display unit works for the add-on reaction force OFF control.

When the ECU 5 executes the add-on reaction force OFF control, the target reaction force output unit 55 outputs no motor drive signal Ctl1. Thus, no add-on reaction force Pa is added to the pedal reaction force Pp.

In addition, when the ECU 5 executes the add-on reaction force OFF control, the display controller 56 makes the segments (the first segment 10a to the 14th segment 10n) in the operation amount display section 10 emit light in white (the first color) according to the accelerator operation amount SL of the accelerator pedal 2. On the other hand, the display controller 56 makes the efficiency display section 11 and the range display section 12 halt light emission. As a result, as indicated with solid lines in FIG. 11, the operation amount display section 10 emits light in white according to the accelerator operation amount SL.

Furthermore, when the ECU 5 executes the add-on reaction force OFF control, the display controller 56 controls the operation amount display section 10 in a way that each of the 14 segments (the first segment 10a to the 14th segment 10n) included in the operation amount display section 10 corresponds to one fourteenth of all the amount of operation of the accelerator pedal 2. That is to say, the configuration is made such that each time the accelerator operation amount SL changes by one fourteenth of all the amount of operation, a corresponding segment starts to emit light (or halts light emission).

Moreover, when the ECU 5 executes the add-on reaction force OFF control, the display controller 56 makes the efficiency display section 11 and the range display section 12 halt light emission. When the ECU 5 executes the add-on reaction force OFF control, the display controller 56 further makes the OFF icon 14 start to emit light.

Thus, when the ECU 5 executes the add-on reaction force OFF control, the OFF icon 14 emits light, as shown FIG. 11, while the efficiency display section 11 and the range display section 12 emits no light, as indicated with dashed lines.

This configuration makes it possible for the driver to visually recognize that no add-on reaction force Pa is being added to the pedal reaction force Pp of the accelerator pedal 2 with the assistance of the light emission of the OFF icon 14.

Moreover, the driver can visually recognize the accelerator operation amount SL according to how many segments are emitting light in the operation amount display section 10.

It should be noted that in a case where the vehicle is set in a non-running mode such as in a case the transmission (automatic transmission), albeit not illustrated, is set in a neutral mode or a parking mode, the add-on reaction force Pa does not have to be added to the pedal reaction force Pp of the accelerator pedal 2. Accordingly, the ECU 5 may be configured to execute the add-on reaction force OFF control, and thus to add no add-on reaction force Pa to the pedal reaction force Pp of the accelerator pedal 2, in the case where the transmission, albeit not illustrated, is set in the neutral mode or the parking mode. In other words, the reaction force generator may be configured such that when the driver sets the vehicle in the non-running mode, the reaction force generator 4 enters the reaction-force addition stopping state in which the reaction force generator 4 adds no add-on reaction force Pa to the pedal reaction force Pp.

Thus, in the case where the vehicle is set in the non-running mode, the efficiency display section 11 and the range display section 12 are made to halt light emission. For this reason, by visually checking that the efficiency display section 11 and the range display section 12 are halting light emission, the driver can visually recognize that the vehicle is set in the non-running mode (the neutral mode or the parking mode).

Meanwhile, since in the operation amount display section 10, segments whose number corresponds to the accelerator operation amount SL emit light in white, the driver can visually recognize the accelerator operation amount SL.

It should be noted that the present invention is not limited to the foregoing embodiment. Design changes may be made to the present invention as needed within a scope not departing from the gist of the invention.

For instance, the arrangement of the first segment 10a to the 14th segment 10n in the operation amount display section 10, the shape of the efficiency display section 11, and the shape of the range display section 12 are shown just as examples, and are not limited to these exemplified shapes (arrangement).

When starting to execute the eco-drive assistance, the ECU 5 (see FIG. 1A) of the embodiment designates the first segment 10a to the eighth segment 10h as the eco segments, and the ninth segment 10i to the 14th segment 10n as the non-eco segments, as shown in FIG. 1B.

In other words, regardless of the threshold operation amount Th1, the ECU 5 (see FIG. 1A) of the embodiment designates the first segment 10a to the eighth segment 10h as the eco segments, and the ninth segment 10i to the 14th segment 10n as the non-eco segments. Thereby, a portion of the accelerator operation amount SL which is represented by each segment changes according to the change in the threshold operation amount Th1, and the portion of the accelerator operation amount SL used to determine which segment is made to emit light (halt light emission) accordingly changes.

For this reason, if the threshold operation amount Th1 changes while the driver keeps the accelerator operation amount SL constant, the number of segments to emit light changes. The operation amount display section 10 (see FIG. 1A) displays the difference between the accelerator operation amount SL and the threshold operation amount Th1 in the form of how many segments are emitting light. Thereby, the driver can visually recognize the difference between the accelerator operation amount SL and the threshold operation amount Th1 easily.

In contrast to this, the ECU 5 (see FIG. 1A) may be configured to designate the eco segments and the non-eco segments depending on how large threshold operation amount Th1 is. For example, the ECU 5 may be configured to designate the first segment 10a to the third segment 10c as the eco segments, and the fourth segment 10d to the 14th segment 10n as the non-eco segments if the threshold operation amount Th1 is equivalent to three fourteenths of all the amount of operation of the accelerator pedal 2.

In addition, for instance, although the first, second and third colors are white, blue and green, respectively, in the reaction force state display unit 1 (see FIG. 3), these colors are shown just as examples. As long as the driver can easily recognize among the first area, the second area and the eco state display area 11a (see FIG. 3), no restriction is imposed on what specific colors are the first, second and third colors, respectively.

Furthermore, although the reaction force state display unit 1 (see FIG. 3) of the embodiment is configured to recognize the types of recognition information depending on the difference in the color of the light emission among them, the reaction force state display unit 1 may be configured to use a single color to highlight the recognition information, and to recognize the types of recognition information depending on the difference in the tone of the same color. The thus-configured reaction force state display unit 1 makes it possible to form the operation amount display section 10, the efficiency display section 11 and the range display section 12 from, for example, a liquid crystal display device which performs its display with a single color only.

Moreover, although as shown in FIG. 1A, the reaction force state display unit 1 of the embodiment is located near the speedometer 70, this location is not limited, either.

Besides, the reaction force state display unit 1 may be configured such that the operation amount display section 10, the efficiency display section 11 and the range display section 12 are displayed on a display screen of a navigation system, albeit not illustrated. Otherwise, the reaction force state display unit 1 may be configured such that the operation amount display section 10, the efficiency display section 11 and the range display section 12 are displayed on the windshield or the like using a head-up display.

What is more, the reaction force state display unit 1 may include icons (albeit not illustrated) configured to emit light when the ECU 5 executes the eco-drive assistance, the sport-drive assistance, the cornering assistance and the collision avoidance assistance, in addition to the TCS icon 13 shown in FIG. 1B. This configuration makes it possible for the driver to visually recognize what assistance the ECU 5 stars to execute or is executing with the assistance of the light emission of the corresponding icon.

In addition, the ECU 5 (see FIG. 1A) may include a switch (albeit not illustrated) configured to stop the addition of the add-on reaction force Pa to the pedal reaction force Pp.

For example, when the ECU 5 executes the eco-drive assistance under the condition in which the driver stops the addition of the add-on reaction force Pa to the pedal reaction force Pp by manipulating the switch, the drive assistance by the ECU 5 can be executed using only the light emission of the operation amount display section 10, the efficiency display section 11 and the range display section 12.

When the pedal reaction force Pp is amplified by adding the add-on reaction force Pa to the pedal reaction force Pp, the feeling (pedal feel) accompanying the operation of the accelerator pedal becomes different. Some drivers may feel uneasiness. However, the use of only the operation amount display section 10, the efficiency display section 11 and the range display section 12 makes it possible for the ECU 5 to assist the driver in his/her driving maneuver without making the driver feel uneasiness.

Furthermore, when the driver stops the addition of the add-on reaction force Pa to the pedal reaction force Pp, the reaction force state display unit 1 may be configured such that only the eco segments in the operation amount display section 10 (see FIG. 1B) emit light according to the accelerator operation amount SL of the accelerator pedal 2 (see FIG. 1A) This configuration makes it possible for the driver to visually recognize that the add-on reaction force Pa is stopped being added to the pedal reaction force Pp by visually checking that no non-eco segments emit light.

Moreover, when the driver stops the addition of the add-on reaction force Pa to the pedal reaction force Pp, the reaction force state display unit 1 may be configured to make the operation amount display section 10, the efficiency display section 11 and the range display section 12 halt light emission. Even this configuration makes it possible for the driver to visually recognize that the add-on reaction force Pa is stopped being added to the pedal reaction force Pp. Incidentally, if the reaction force state display unit 1 is configured to make the OFF icon 14 emit light in that case, the configuration makes it possible for the driver to understand that the reason for the halt of the light emission is not malfunction of the reaction force state display unit 1.

Besides, the reaction force state display unit 1 may be configured such that when the ECU 5 (see FIG. 1A) executes the sport-drive assistance, the sport-mode reaction force calculator 52 (see FIG. 1A) calculates the add-on reaction force Pa, for example according to the front-rear acceleration of the vehicle, and this add-on reaction force Pa is added to the pedal reaction force Pp. This configuration makes it possible to amplify the pedal reaction force Pp by adding the add-on reaction force Pa to the pedal reaction force Pp, for example when the front-rear acceleration is large (that is to say, when the vehicle accelerates much). This inhibits the driver from excessively depressing the accelerator pedal 2 (see FIG. 1A).

What is more, although as shown in FIG. 1B, the operation amount display section 10 of the embodiment are provided with the multiple segments arranged in an arc, the operation amount display section 10 may be configured to display the accelerator operation amount SL, for example by expanding and contracting a light-emitting portion of a light-emitting member (for example, an organic EL device or a light-emitting diode) shaped like a bar.

REFERENCE SIGNS LIST 1 reaction force state display unit (information transmission unit)
2 accelerator pedal (pedal)
4 reaction force generator (reaction force adding unit)
9 pedal reactive force controller
10 operation amount display section
11 efficiency display section
SL2 slip limit operation amount (operation threshold value)
Th1 threshold operation amount (operation threshold value)

The invention claimed is:
1. A pedal reactive force controller comprising:
 a reaction force adding unit for adding reaction force to a pedal operated by a driver; and
 an information transmission unit for converting a depression amount of the pedal detected by a stroke sensor into visual information, and conveying the depression amount to the driver by displaying the visual information in an operation amount display section,
 wherein:
 the reaction force adding unit sets an operation threshold value of the depression amount at which the reaction force adding unit starts to add the reaction force to the pedal, and
 the visual information includes
  first discriminating information showing that no reaction force is being added to the pedal, and
  second discriminating information showing that the reaction force is being added to the pedal,
 the operation amount display section is divided into a first area for displaying the visual information inclusive of the first discriminating information, and
a second area for displaying the visual information inclusive of the second discriminating information,
the information transmission unit conveys the depression amount to the driver in a form of the visual information including the first discriminating information, and displayed in the first area, while the depression amount is less than the operation threshold value,
the information transmission unit conveys the depression amount to the driver in the form of the visual information including the second discriminating information in addition to the first discriminating information, and displayed in the first area and the second area, when the depression amount becomes greater than the operation threshold value, and
as the depression amount becomes larger, more of the visual information is displayed in the operation amount display section.

2. The pedal reactive force controller according to claim 1, wherein
the visual information is displayed in a form of light emission of a plurality of segments arranged in an arc, and forming the operation amount display section,
the segments sequentially emit light according to the depression amount, and
a light emission color of the segments is different between the first area and the second area.

3. The pedal reactive force controller according to claim 1, wherein
the pedal is an accelerator pedal with which the driver adjusts power, outputted from a power source of a vehicle, for driving a drive wheel,
the power source includes a first state and a second state which are divided based on an amount of energy to be consumed to generate the power,
the first state is a state in which no energy is consumed, or the amount of energy consumption is less than that in the second state, and
in a case where the first state and the second state are switched over to each other according to the depression amount, the reaction force adding unit sets the operation threshold value at the depression amount at which the first state is switched over to the second state.

4. The pedal reactive force controller according to claim 3, wherein the information transmission unit includes an efficiency display section for displaying second visual information, and puts more emphasis on a display of the second visual information in the efficiency display section as a length of time for which the depression amount is kept at the operation threshold value becomes longer.

5. The pedal reactive force controller according to claim 3, wherein the information transmission unit includes an efficiency display section for displaying second visual information, and puts more emphasis on a display of the second visual information in the efficiency display section as the depression amount becomes closer to the operation threshold value within a range below the operation threshold value.

6. The pedal reactive force controller according to claim 3, wherein the information transmission unit includes an efficiency display section for displaying second visual information, and puts more emphasis on a display of the second visual information in the efficiency display section as the depression amount becomes closer to the operation threshold value from a range above the operation threshold value.

7. The pedal reactive force controller according to claim 3, wherein
the power source includes
an electric motor for outputting the power while consuming electric power, and
an internal combustion engine for outputting the power while consuming the energy, the first state is a state in which only the electric motor drives, and
the second state is a state in which the internal combustion engine drives.

8. The pedal reactive force controller according to claim 3, wherein
the power source includes
an electric motor for outputting the power while consuming electric power, and
an internal combustion engine including a function of generating the electric power while consuming the energy,
the first state is a state in which only the electric motor drives, and
the second state is a state in which the internal combustion engine drives.

9. The pedal reactive force controller according to claim 1, wherein
the pedal is an accelerator pedal with which the driver adjusts power, outputted from a power source of a vehicle, for driving a drive wheel, and
the reaction force adding unit sets the operation threshold value at the depression amount which drives the power source of the vehicle with highest efficiency.

10. The pedal reactive force controller according to claim 9, wherein the information transmission unit includes an efficiency display section for displaying second visual information, and puts more emphasis on a display of the second visual information in the efficiency display section as a length of time for which the depression amount is kept at the operation threshold value becomes longer.

11. The pedal reactive force controller according to claim 1, wherein in a case where regardless of how large or small the depression amount is, the reaction force adding unit adds the reaction force to the pedal based on vehicle information, the information transmission unit designates all the operation amount display section as the second area for displaying the visual information inclusive of a second recognition information, and displays the visual information including the second recognition information in the operation amount display section.

12. The pedal reactive force controller according to claim 1, wherein
the pedal is an accelerator pedal with which the driver adjusts power, outputted from a power source of a vehicle, for driving a drive wheel, and
the reaction force adding unit sets the operation threshold value at the depression amount at which the power outputted from the power source causes the drive wheel to lose traction.

13. The pedal reactive force controller according to claim 1, wherein in a case where the reaction force adding unit is in a reaction-force addition stopping state in which the reaction force adding unit always adds no reaction force to the pedal regardless of how large or small the depression amount is, all the operation amount display section is designated as the first area, and the visual information including a first recognition information is displayed in the operation amount display section.

14. The pedal reactive force controller according to claim 13, wherein in a case where the driver sets a vehicle not to run, the reaction force adding unit is in the reaction-force addition stopping state.

15. The pedal reactive force controller according to claim 1, wherein
the pedal is an accelerator pedal with which the driver adjusts power, outputted from a power source of a vehicle, for driving a drive wheel, and
in a case where the driver sets the vehicle to run backward, the visual information including a first recognition information is displayed in the first area while the depression amount is less than the operation threshold value, and the visual information including a second recognition information is displayed in the second area while the depression amount is greater than the operation threshold value.

* * * * *